(12) United States Patent
Krigstin et al.

(10) Patent No.: US 9,850,623 B2
(45) Date of Patent: Dec. 26, 2017

(54) WATER, GREASE AND HEAT RESISTANT BIO-BASED PRODUCTS AND METHOD OF MAKING SAME

(71) Applicants: Sally Krigstin, Thornhill (CA); Mohini Mohan Sain, Toronto (CA); Javad Sameni, Toronto (CA)

(72) Inventors: Sally Krigstin, Thornhill (CA); Mohini Mohan Sain, Toronto (CA); Javad Sameni, Toronto (CA)

( * ) Notice: Subject to any disclaimer, the term of this patent is extended or adjusted under 35 U.S.C. 154(b) by 512 days.

(21) Appl. No.: 14/555,354

(22) Filed: Nov. 26, 2014

(65) Prior Publication Data

US 2016/0145480 A1    May 26, 2016

(51) Int. Cl.
*D21H 19/34* (2006.01)
*D21H 19/12* (2006.01)
(Continued)

(52) U.S. Cl.
CPC .............. *D21H 19/34* (2013.01); *B05D 1/02* (2013.01); *B05D 1/28* (2013.01); *B05D 3/0254* (2013.01); *B05D 5/00* (2013.01); *B05D 7/02* (2013.01); *B05D 7/10* (2013.01); *C03C 17/007* (2013.01); *D21H 19/10* (2013.01); *D21H 19/12* (2013.01); *D21H 19/24* (2013.01); *D21H 19/64* (2013.01); *D21H 21/16* (2013.01); *C03C 2217/445* (2013.01); *C03C 2217/76* (2013.01)

(58) Field of Classification Search
None
See application file for complete search history.

(56) References Cited

U.S. PATENT DOCUMENTS

| 2,563,897 A | 8/1951 | Wilson et al. |
| 5,100,511 A | 3/1992 | Simonson et al. |

(Continued)

FOREIGN PATENT DOCUMENTS

| CA | 1288204 | 9/1991 |
| CA | 2692694 | 1/2009 |

(Continued)

OTHER PUBLICATIONS

Arnson, T. (1980). The adsorption of complex aluminum species by cellulosic fibers from dilute solutions of aluminum chloride and aluminum sulphate. Ph.D. Dissertation.

(Continued)

*Primary Examiner* — Michael Wieczorek
*Assistant Examiner* — Bradford Gates
(74) *Attorney, Agent, or Firm* — Lynn C. Schumacher; Stephen W. Leonard; Hill & Schumacher

(57) ABSTRACT

The present disclosure provides a stable aqueous composition comprising an aqueous component, a hydrophobic complex comprised of a multivalent metal salt complexed with nanocellulose fibers and lignin, with the composition exhibiting a viscosity sufficient to prevent coalescing and settling of the hydrophobic complex in the aqueous component. The composition may be used to coat surfaces of articles to produce a hydrophobic surface. Once applied to the surface, the aqueous coating is spread to form a wet film covering the surface and is then dewatered and dried to produce a dried hydrophobic coating.

**40 Claims, 17 Drawing Sheets
(11 of 17 Drawing Sheet(s) Filed in Color)**

Proposed structure of HNCF.

(51) Int. Cl.
| | |
|---|---|
| D21H 19/10 | (2006.01) |
| B05D 1/02 | (2006.01) |
| B05D 1/28 | (2006.01) |
| B05D 3/02 | (2006.01) |
| B05D 5/00 | (2006.01) |
| B05D 7/10 | (2006.01) |
| B05D 7/02 | (2006.01) |
| D21H 19/24 | (2006.01) |
| D21H 19/64 | (2006.01) |
| D21H 21/16 | (2006.01) |
| C03C 17/00 | (2006.01) |

(56) References Cited

U.S. PATENT DOCUMENTS

| | | | |
|---|---|---|---|
| 5,110,414 A | 5/1992 | Forss et al. | |
| 6,117,545 A | 9/2000 | Cavaille et al. | |
| 6,268,414 B1 | 7/2001 | Lin | |
| 6,569,540 B1* | 5/2003 | Preston | B27N 1/006 428/537.1 |
| 6,878,199 B2 | 4/2005 | Bowden et al. | |
| 2010/0166968 A1 | 7/2010 | Doherty et al. | |
| 2011/0201755 A1 | 8/2011 | Hamad et al. | |
| 2012/0070864 A1* | 3/2012 | Liu | C12N 9/2437 435/99 |

FOREIGN PATENT DOCUMENTS

| | | |
|---|---|---|
| CA | 2750082 | 8/2010 |
| WO | 8404765 | 12/1984 |
| WO | 2010066905 | 6/2010 |

OTHER PUBLICATIONS

Charreau, H., Foresti, M.L., and A. Vazquez. 2013. Nanocellulse Patent Trends: A Comprehensive Review on Patents on Cellulose Nanocrystals, Microfibrillated and Bacterial Cellulose. Recent Patents on Nanotechnology, 2013, 7, 56-80.

Hayden, P. L. and A. J. Rubin. 1974. Systematic Investigation of the Hydrolysis and Precipitation of Aluminum (III). Aqueous Environmental Chemistry of Metal. A. J. Rubin. Ann Arbor: 318-379.

Hult, E.-L. I. (2010). Efficient approach to high barrier packaging using microfibrillar cellulose and shellac. Cellulose , 17 (3), 575-586.

Iguchi M., Yamanaka S., and A. Budhiono. 2000. Review bacterial cellulose—a masterpiece of nature's arts. J Mater Sci 2000; 35: 261-70.

Lavoine, N. D. (2012). Microfibrillated cellulose—Its barrier properties and applications in cellulosic materials: A review. carbohydrate Polymers , 90, 735-764.

Rodionova,G., Lenes, M., Eriksen, O. and O. Gregersen. 2010. Surface chemical modification of microfibrillated cellulose: improvement of barrier properties for packaging applications. Cellulose Jan. 2010; 18(1):127-134.

Spence, K. V. (2010). The effect of chemical composition on microfibrillar cellulose films from wood pulps: water interactions and physical properties for packaging applications. Cellulose , 17, 835-848.

Syverud, K. A. (2009). Strength and barrier properties of MFC films. Cellulose , 16, 75-85.

Susheel Kalia et al., Cellulose Based Bio-and Nanocomposites: A Review, International Journal of Polymer Science 2011, Article 837875, pp. 1-35.

Karim Missoum et al., Nanofibrillated Cellulose Surface Modification: A Review, Materials 2013, 6, pp. 1745-1766.

Sandeep S. Nair et al., High Performance green barriers based on nanocellulose, Sustainable Chemical Processes published on line Nov. 7, 2014, 2:23, pp. 1-7.

Alain Dufresne, Nanocellulose: a new ageless bionanomaterial, Materials Today. Jun. 2013, 16(6), pp. 220-227.

Carlos Salas et al., Nanocellulose properties and applications in colloids and interfaces, Opinion in Colloid & Interface Science, Published online Oct. 30, 2014, 19, pp. 383-396.

K. Xhanari et al., Emulsions Stabilized by Microfibrillated Cellulose: The Effect of Hydrophobization. Concentration and O/W Ratio, Journal of Dispersion Science and Technology 2011, 32, pp. 447-452.

Zhaoping Song et al., Hydrophobic-modified nano-cellulose fibre/ PLA biodegradable composites for lowering water vapor transmission rate (WVTR) of paper, Carbohydrate Polymers Published online Apr. 21, 2014, 111, pp. 442-448.

Hikaru Aimi et al., Formation of a complex with aluminum by ozone-treated kraft lignins and their low molecular weight fragments, J Wood Sci. 2010, 56, pp. 133-139.

Natercia C.T. Martins et al., Electrostatic assembly of Ag nanoparticles onto nanofibrilloted cellulose for antibacteria paper products, Cellulose 2012, 19, pp. 1425-1436.

International Search Report in PCT/CA2015/051129 dated Feb. 22, 2016.

Written Opinion in PCT/CA2015/051129 dated Feb. 22, 2016.

* cited by examiner

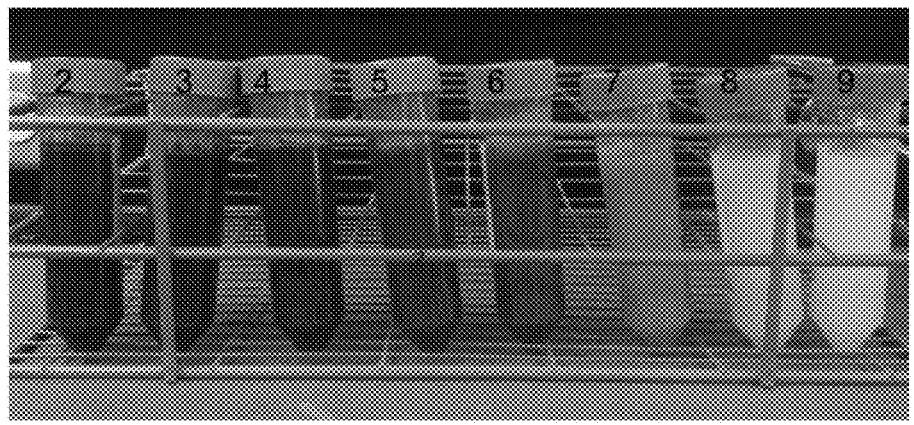
Figure 1. Stability test of modified and unmodified nano-cellulose fiber solutions.

| Formulation | Picture | Description |
|---|---|---|
| Lignin only Solution #1 | 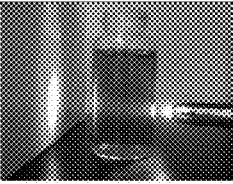 | Stable suspension (colloid) |
| Lig-NCF10 Solution #5 | 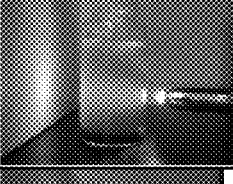 | Suspension, although we can see the beam throuth the sample it is not colloid because of the edimentation. |
| Lig-NCF90 Solution #7 | 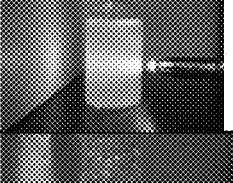 | Stable suspension (colloid) |
| NCF only Solution #10 | 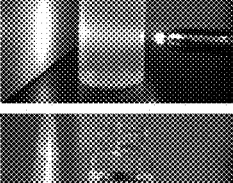 | Stable suspension (colloid) |
| Water or NaOH solution |  | True solution |

Figure 2: Tyndall effect of solutions.

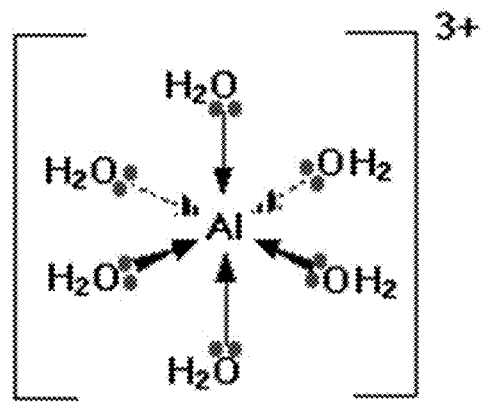
Figure 3. Complex ion of aluminum.
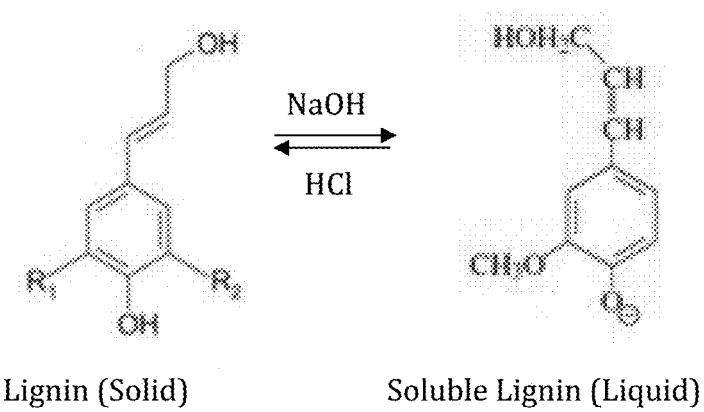
Figure 4. Lignin structure in acid/base solution.

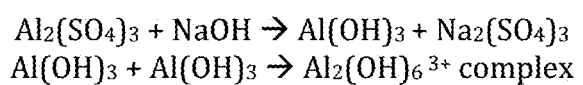
Al$_2$(SO$_4$)$_3$ + NaOH → Al(OH)$_3$ + Na$_2$(SO$_4$)$_3$
Al(OH)$_3$ + Al(OH)$_3$ → Al$_2$(OH)$_6$ $^{3+}$ complex
Figure 5. Proposed alum reactions in alkaline.
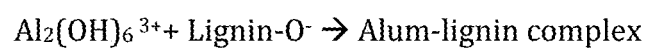
Al$_2$(OH)$_6$ $^{3+}$ + Lignin-O$^-$ → Alum-lignin complex
Figure 6. Proposed alum reaction with lignin
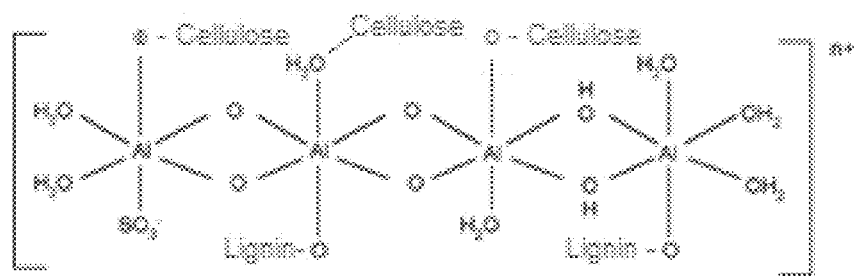
Figure 7. Proposed structure of HNCF.

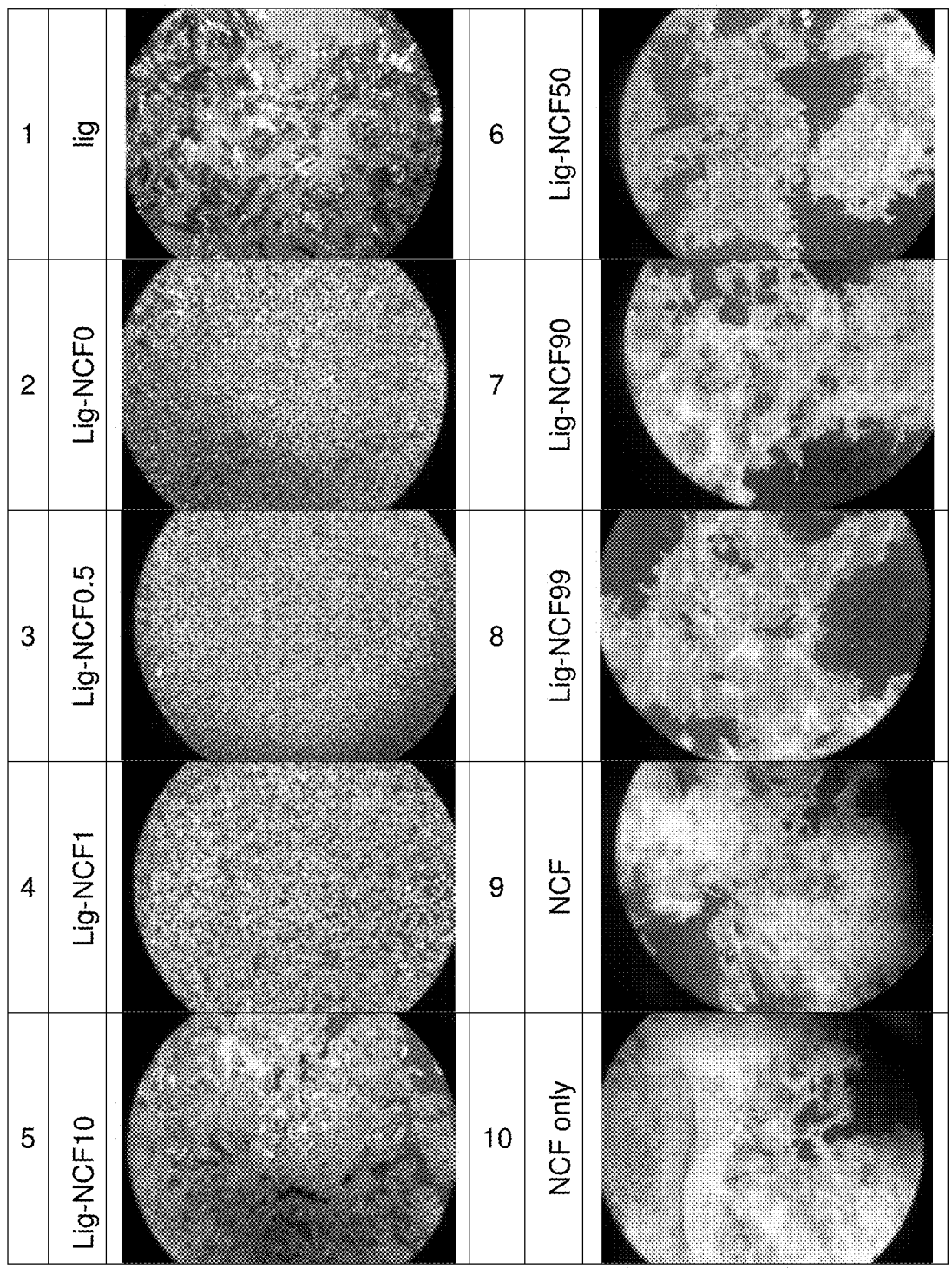
Figure 8. Micrographs of freeze dried solutions from Table 1.

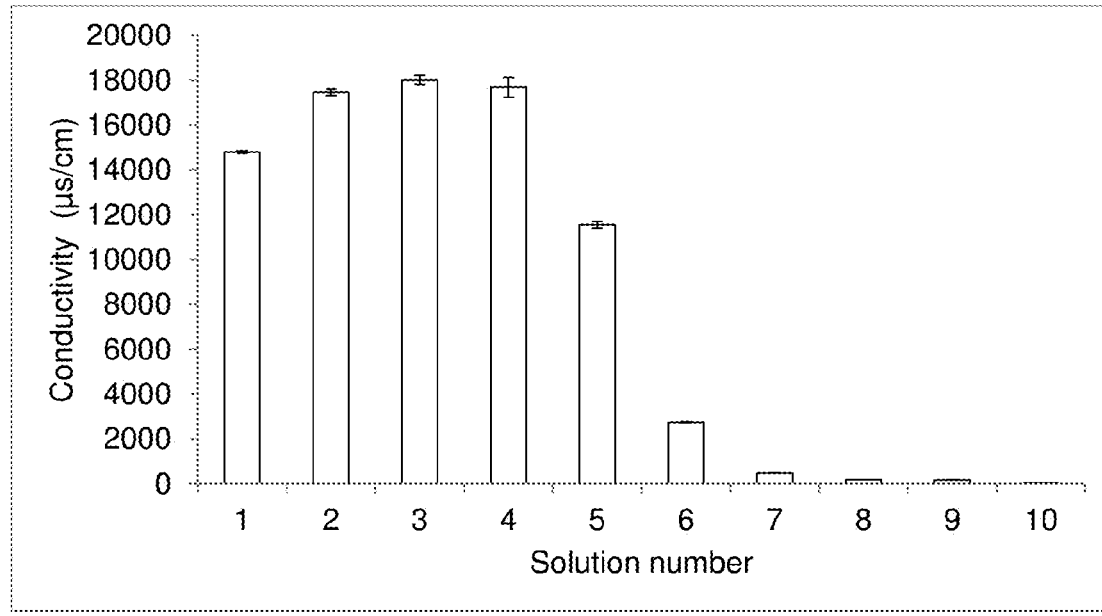
Figure 9. Conductivity of solutions 1-10.
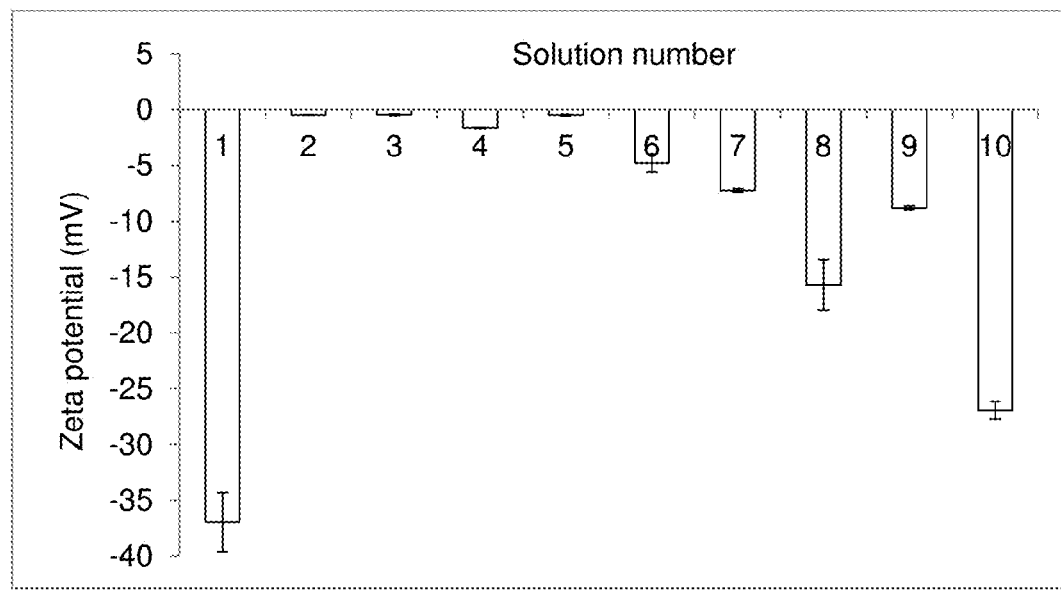
Figure 10. Zeta potential of solutions 1-10.

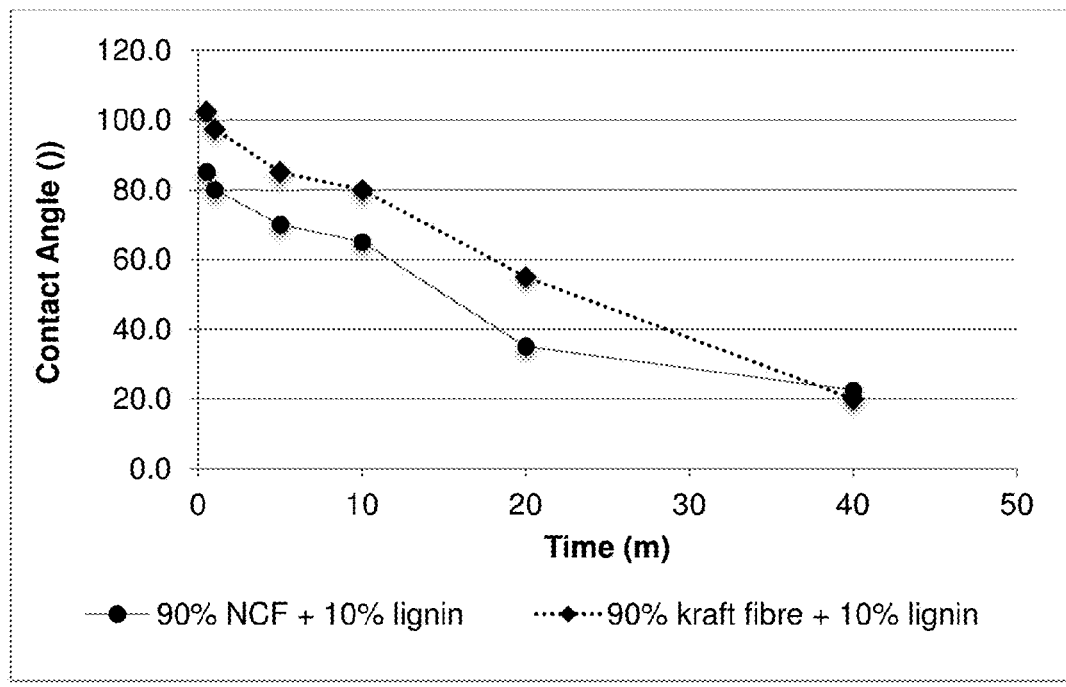
Figure 11. A plot comparing the change in contact angle of a water drop on handsheets made from HNCF and hydrophobic kraft fiber.
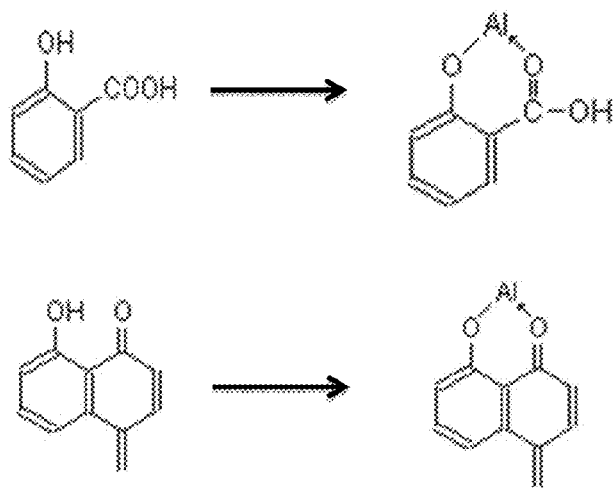
Figure 12. Examples of potential bonding between lignin and alum complex.

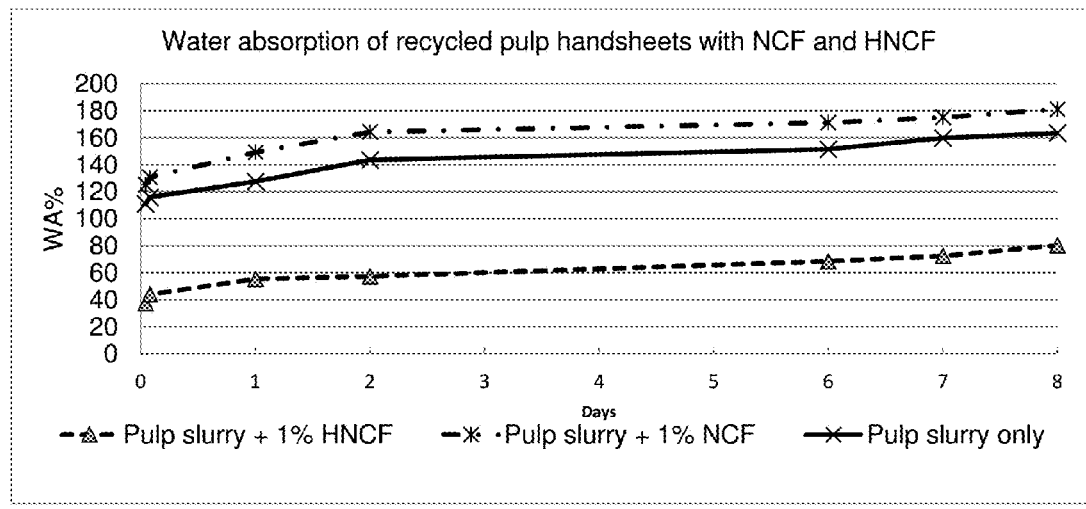
Figure 13. Water absorption of handsheets with NCF and HNCF.
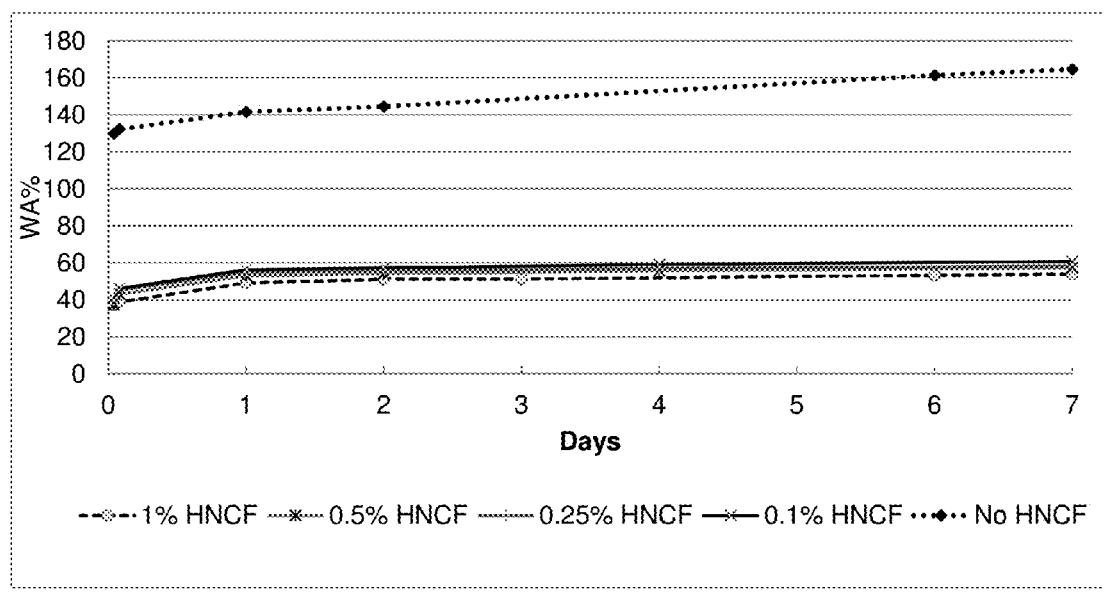
Figure 14. Water absorption of handsheets with varying levels of HNCF addition.

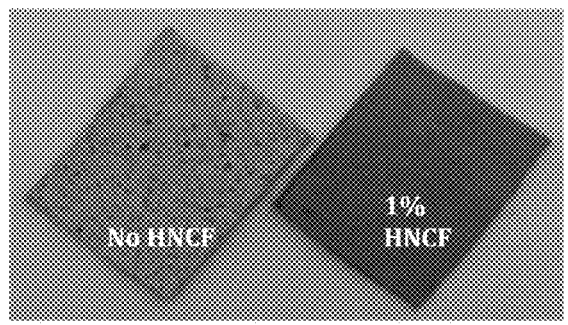
Figure 15. Photograph of handsheet with no HNCF and handsheet with 1% HNCF addition.
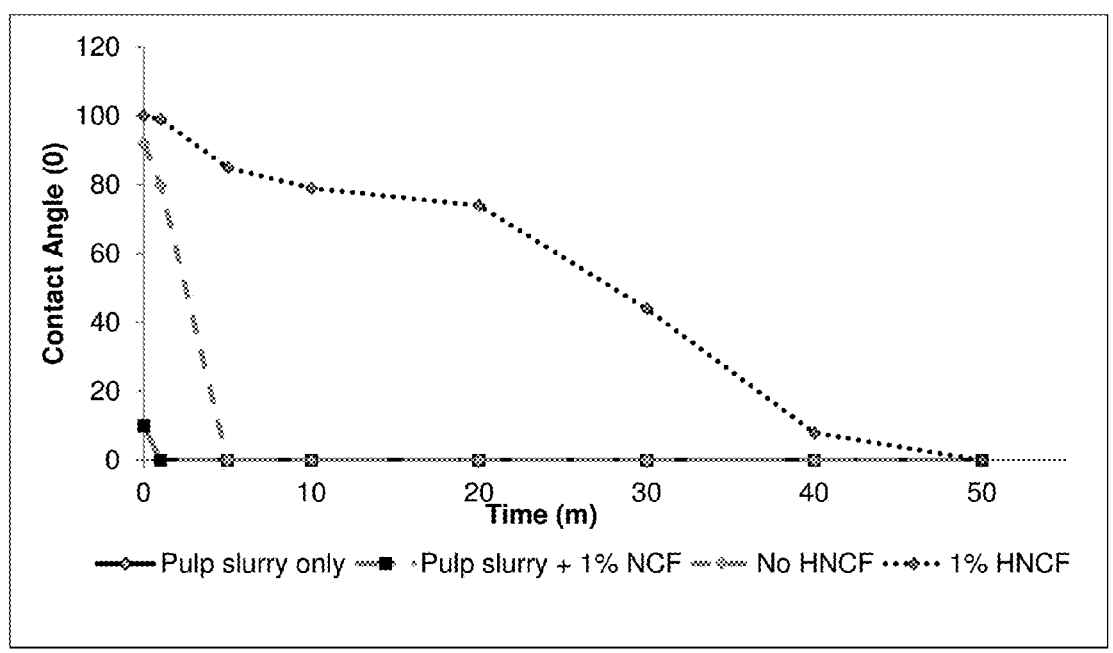
Figure 16. Static contact angle measurement of samples.

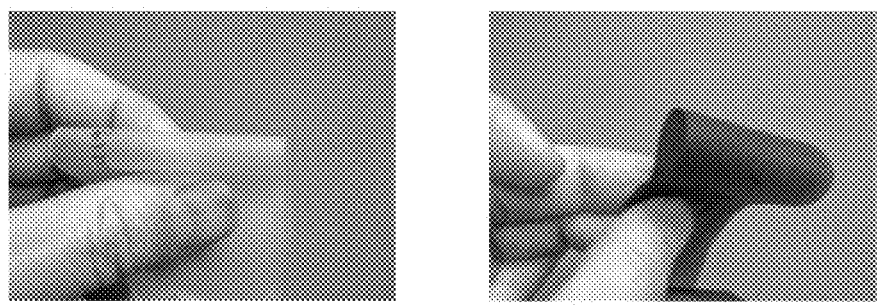
Figure 17. a) NCF film b) HNCF film
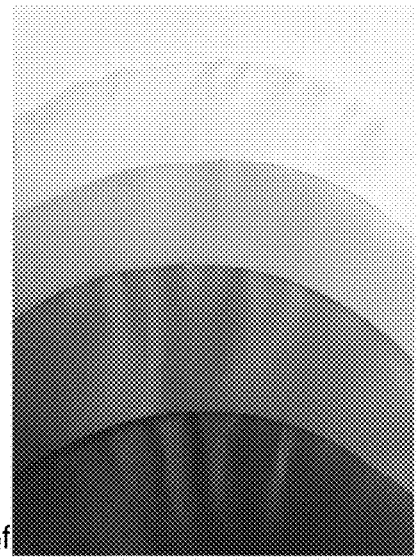
Figure 18. Samples of CF (5%), HNCF (10%)

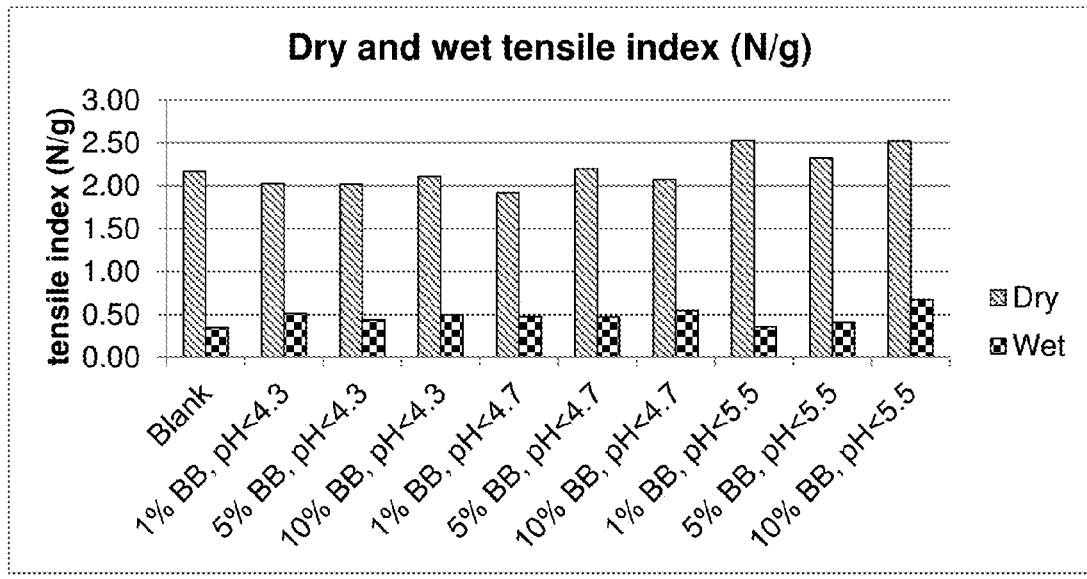
Figure 19. Tensile index at various lignin loadings and final pH's.
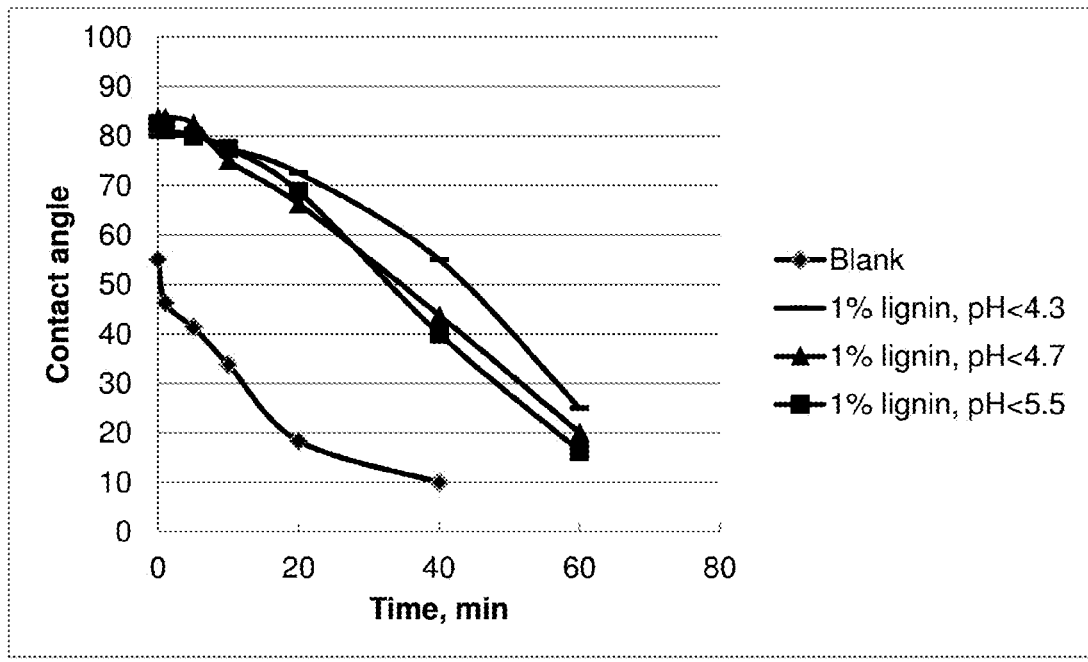
Figure 20. A plot showing the change in contact angle over time for HNCF films made with 1% lignin to NCF, at various final pH's.

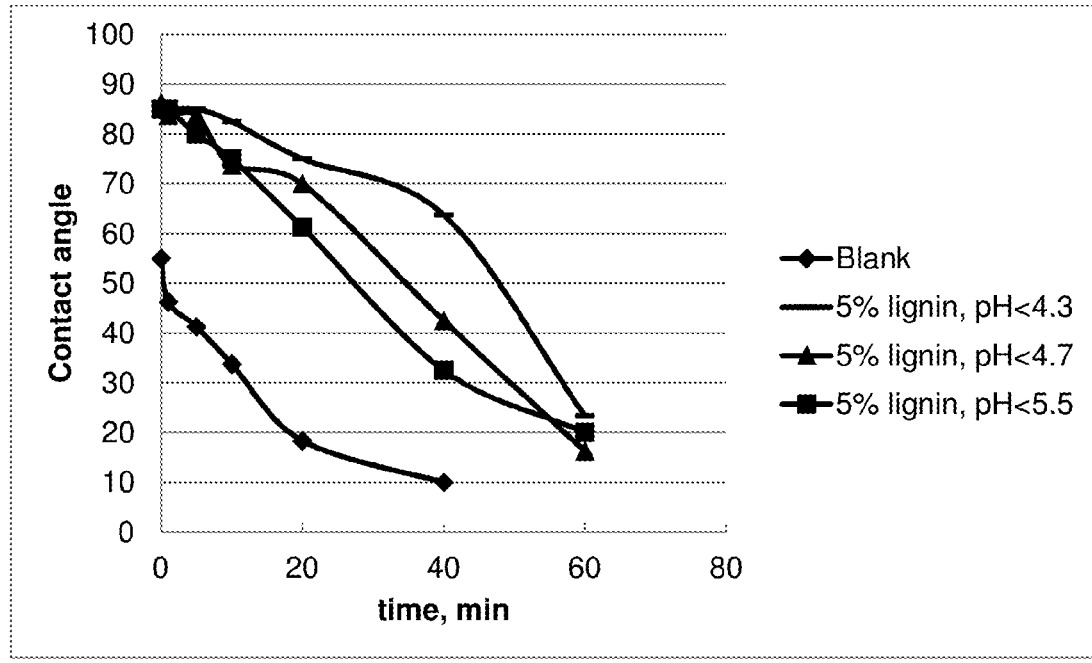
Figure 21. A plot showing the change in contact angle over time for HNCF films made with 5% lignin to NCF, at various final pH's.
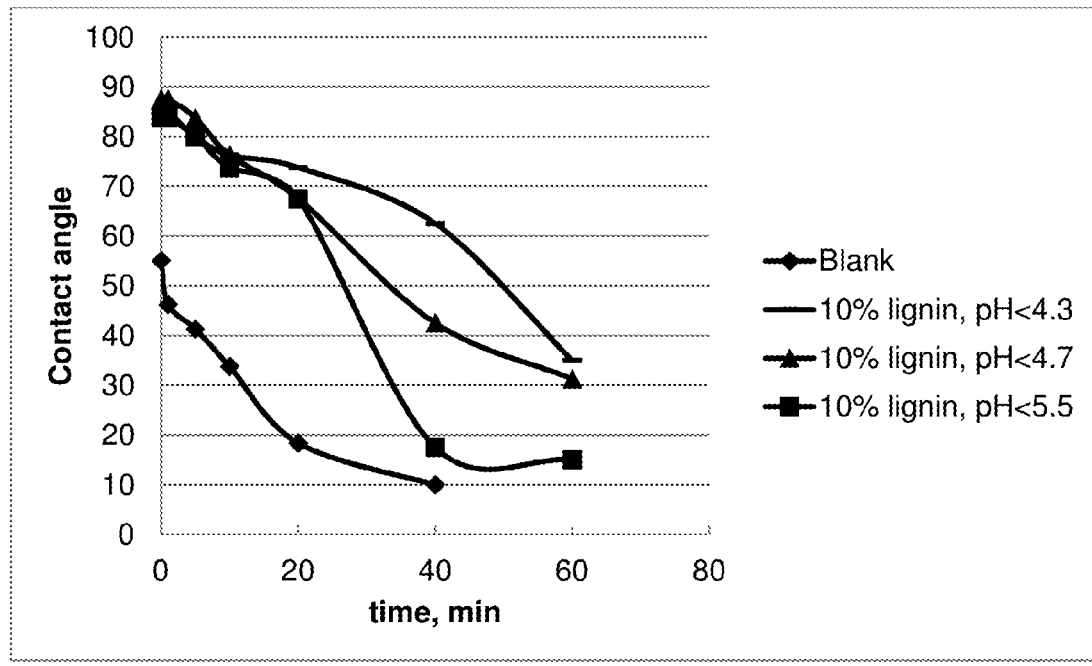
Figure 22. A plot showing the change in contact angle over time for HNCF films made with 10% lignin to NCF, at various final pH's.

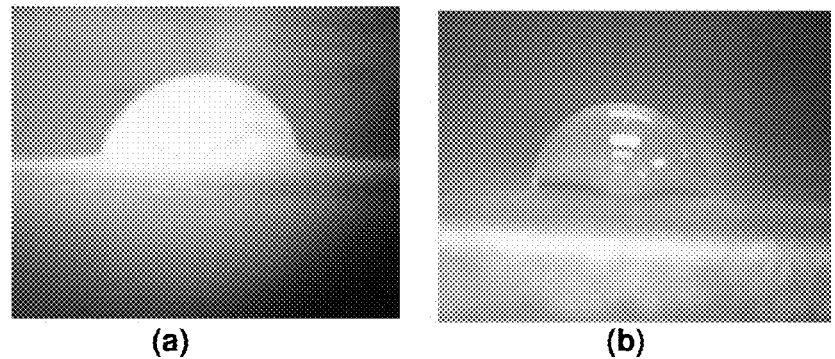
Figure 23. An photograph of a magnified water drop showing the contact angle, on a) NCF film b)HNCF film.
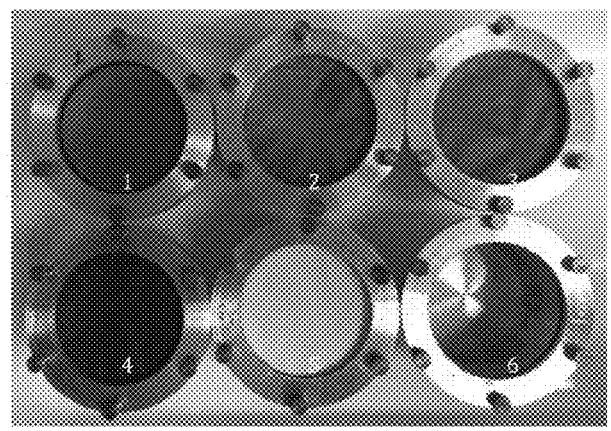
Figure 24. WVTR testing (1 blank, 2 HNCF (1%, low pH), 3 HNCF (5%, low pH), 4 HNCF (10%, low pH), 5 copy paper, 6 empty container.

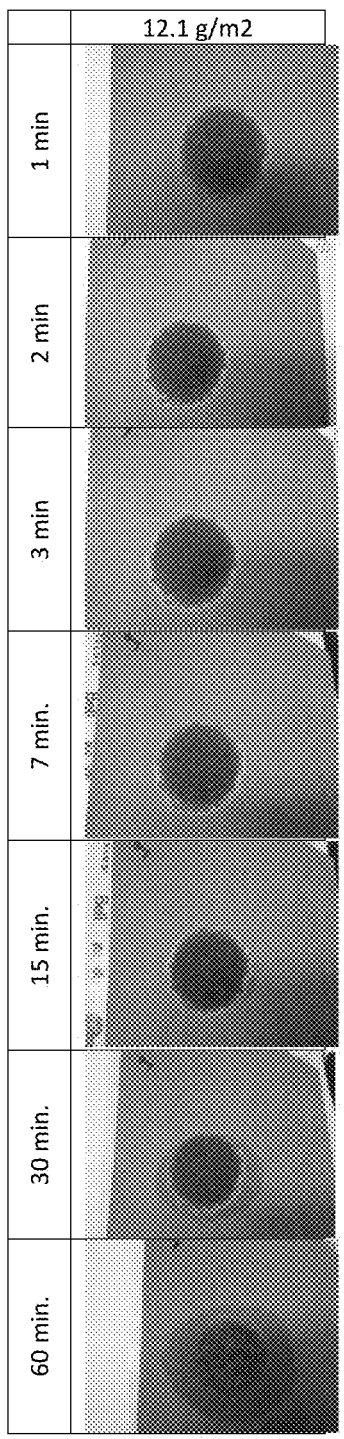
Figure 25. Photographs of HNCF coated paper being evaluated according to TAPPI T 454 – Turpentine test for voids in glassine and greaseproof papers.

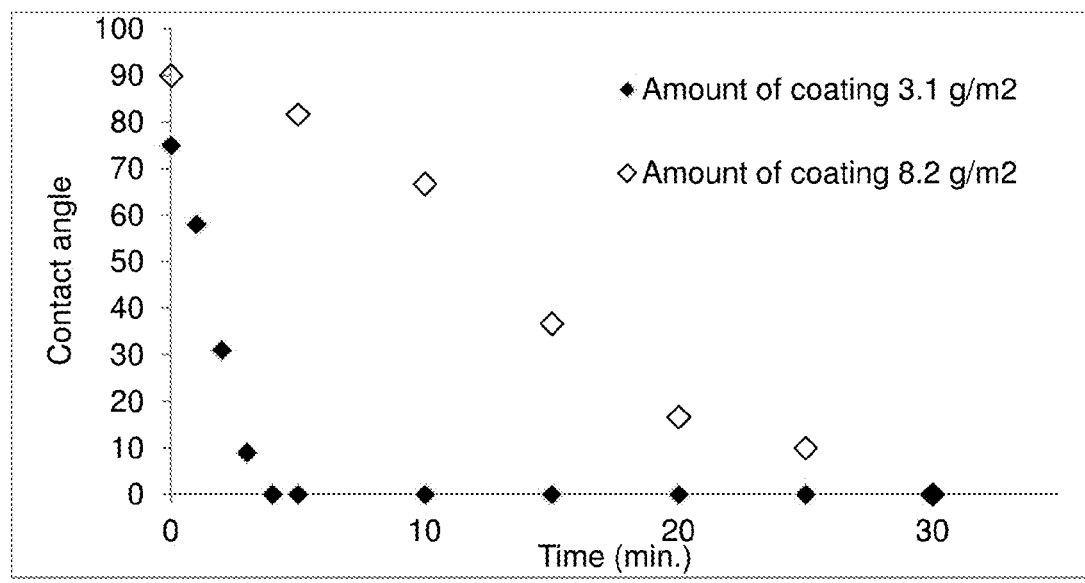
Figure 26. A plot showing change in contact angle of a water drop on an HNCF spray coated paper over time.
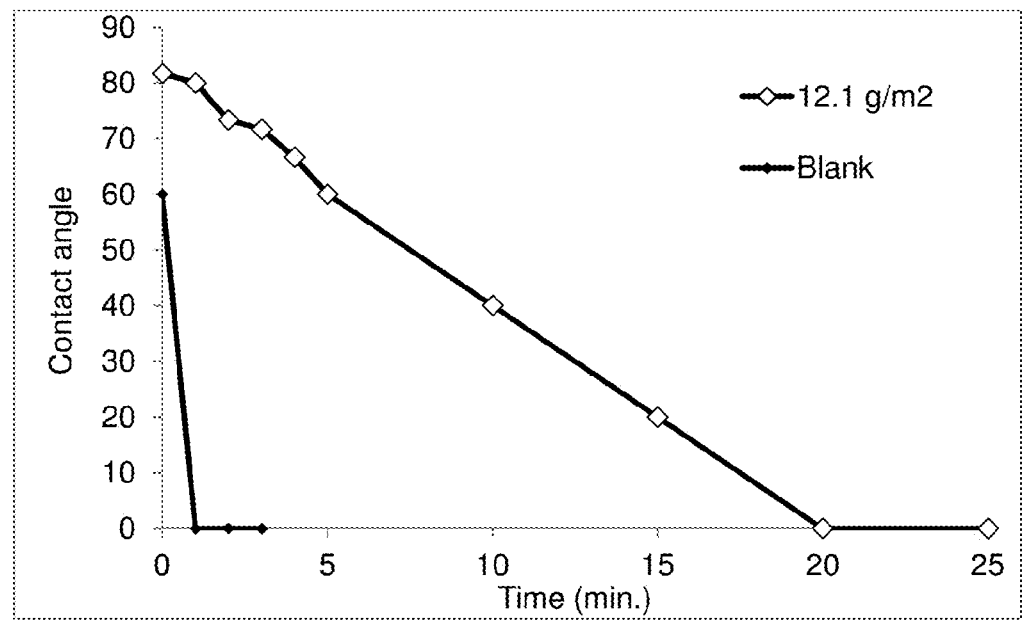
Figure 27. A plot showing change in contact angle of a water drop on an HNCF roll coated paper over time.

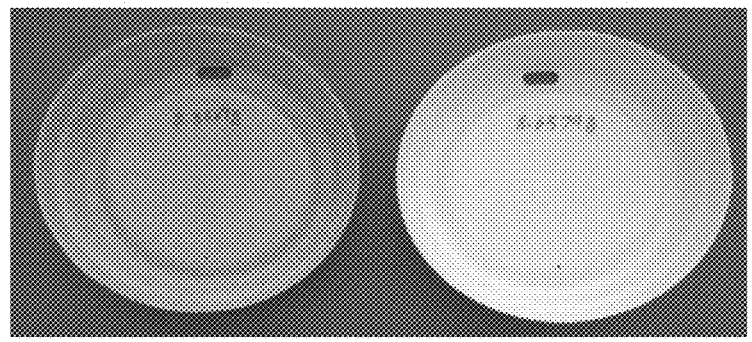
Figure 28. HNCF sprary coated (left) and uncoated (right) coffee cup lids.
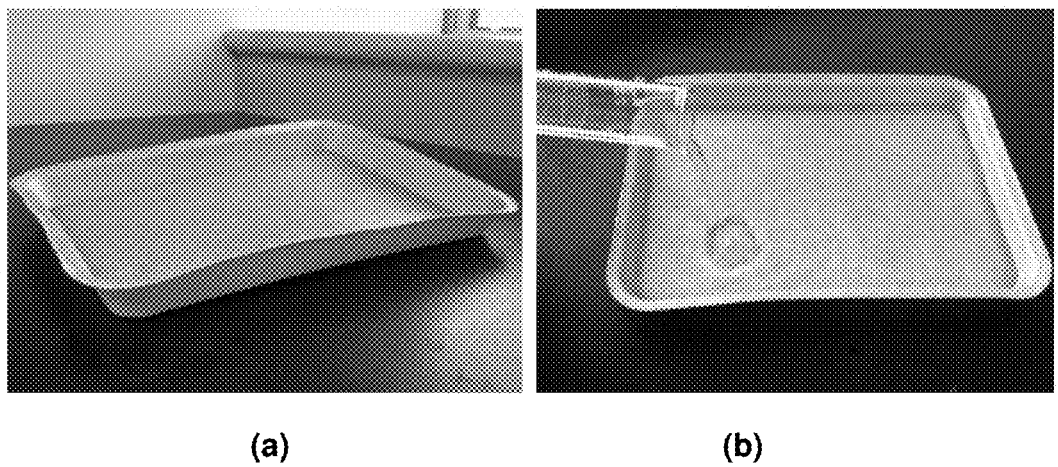
(a)  (b)
Figure 29. Photographs of HNCF spray coated pulp food trays.

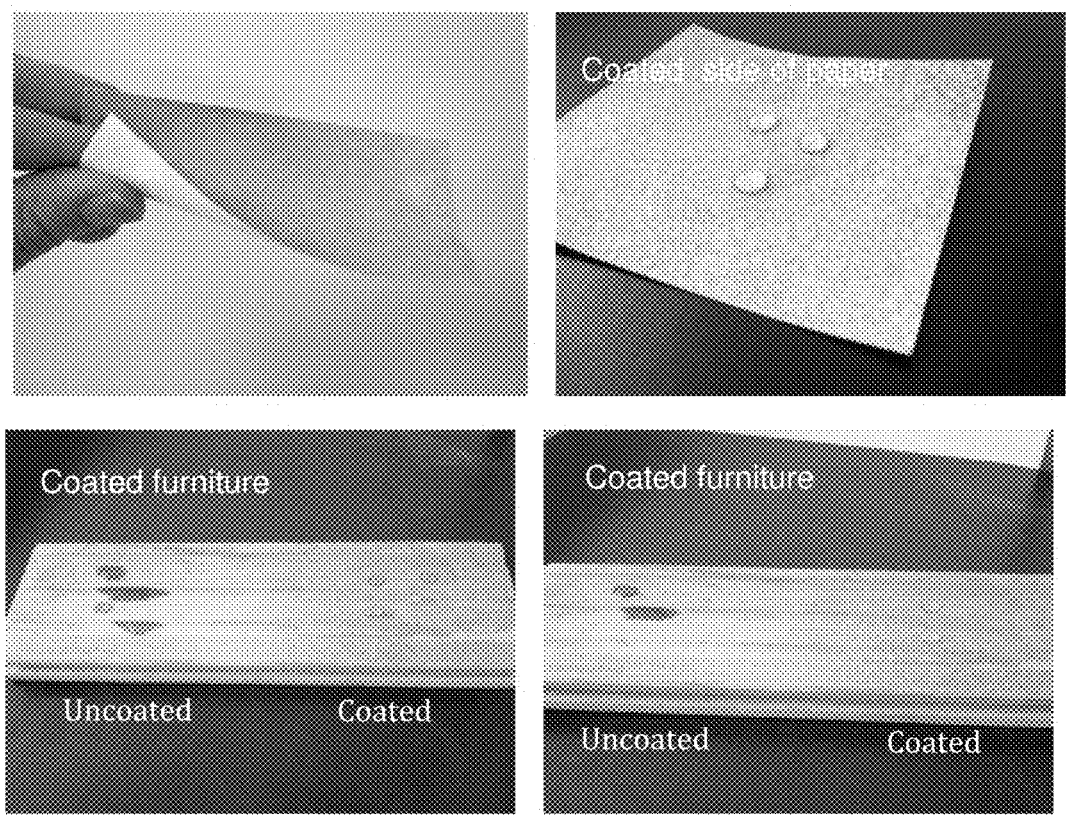
Figure 30. Photographs of HNCF spray coated papers and wood surface, showing hydrophobic character of the coating.

WATER, GREASE AND HEAT RESISTANT BIO-BASED PRODUCTS AND METHOD OF MAKING SAME

FIELD OF THE INVENTION

The present disclosure relates to a process for modifying the surfaces of nano cellulose particles/fibers to increase the hydrophobicity of the surfaces. The process produces a stable aqueous suspension of the modified particles/fibers having a long stable shelf life. The aqueous suspension can be used to coat surfaces of products such as paper and cardboard to mention just a few to render the surfaces hydrophobic.

BACKGROUND

Cellulose nano-particles are produced from native cellulose, which is comprised of D-anhydro-glucopyranose units bonded through beta 1,4 glycosidic linkages. They are produced through a variety of processes and are generally described as having at least one dimension in the 1 to about 100 nm range (Charreau et al. 2013). Nanocellulose fiber (NCF) are derived through three main processes and have different characteristics based on the process used to isolate them. Isolation or extraction of nano-particles from native cellulose is commonly achieved through either 1) acid hydrolysis, creating cellulose nanocrystals (NCC) or whiskers; 2) through mechanical treatment creating, microfibrillated cellulose (MFC) or 3) production via bacteria synthesis, as described by Iguchi et al. (Iguchi et al. 2000).

A wide range of applications have been developed for NCF which take advantage of their high strength and stiffness, abundance, renewability, high aspect ratio and biodegradability (Charreau et al. 2013). The high reactivity of nanocellulose fiber is due to the high number of hydroxyl groups and hydrophilic character. Much effort has been put forward to modify the surface of NCF to make it compatible with various polymers from cellulose acetate (Holbek 1984) to hydrophobic polymer matrices (Bordeanu et al. 2010) so that the range of applications of the modified NCF can be expanded. Various techniques using organic solvents have been developed and involve reacting the hydroxyl groups with silanes, polyethylene glycol (PEG), and polypropylene (PP) (Bordeanu et al 2010). A greener approach of in-situ graft co-polymerization of hydrophobic vinyl acetate and methy methacrylate onto NCC in aqueous medium has been done, achieving some increase in the NCC hydrophobicity (Hamad and Su 2011). Post treatments of NCF have been developed to endow the fiber with hydrophobicity by acetylation, these include works by Rodionova et al. (Rodionova et al. 2010). Others have used sillation with chlorodimethyl isoprpylsinae (Cavaille et al. 2000).

It would be very advantageous to provide a process of surface modification of NCF which can be tuned to give a liquid solution containing modified NCF having various degrees of liquidphobicity and which can be stored for long periods of time in a stable state and can be transferred to secondary surfaces such as fiber, paper, wood, glass, etc, which can then be used to produce any number of products in a large variety of applications.

SUMMARY OF THE INVENTION

The present disclosure provides modified nanocellulose fiber (NCF) or microfibrillated cellulose (MFC) and their combination thereof" in a stable aqueous suspension that exhibits long shelf life which can be used to coat product surfaces. The process for producing the modified NCF allows the hydrophobicity of the particle to be tuned, depending on the proposed application of the coated product.

Surprisingly, contrary to acting like a hydrophilic entity, the process for modifying the NCF disclosed herein results in a non-flocculating distribution of the hydrophobic particles in water which does not agglomerate. This improvement takes advantage of the properties of nano-cellulosics such as their renewability, abundance, large surface to volume ratio, high strength and stiffness, ability to form an impervious network and biodegradability and adds another level of application based on a completely green approach. The process for producing the composition disclosed herein results in products that are safe to use for food packaging and are over 99% bio-based.

The present disclosure provides a bio-based surface modification incorporated onto NCF which gives an amphiphobic surface when the modified NCF is coated onto a surface. The resulting modified NCF is significantly more hydrophobic than the unmodified NCF. This enables multiple functionality as additive and coating as it provides hydrophobicity to normally hydrophilic surfaces. The ability of the modified NCF to still form hydrogen bonds, allows for applications as films, coatings and the formation of films with very low porosity, thereby functioning as a highly performance amphiphobic coating. The modified NCF are also compatible with hydrophobic polymer matrices. The size of the micelles and charge of the modified NCF form a stable aqueous suspension which allows for wide ranging packaging and construction applications.

Lignin is solubilized in an alkali solution. Optimum concentration is 20-25% w/v.

NCF is provided in aqueous suspension at concentration around 1% w/w derived from renewables sources.

The alkali lignin solution is added to the NCF slurry at specified ratio depending on qualities required in the final product.

The two solutions are well mixed.

Aluminum sulphate or other polyatomic metal salt is added to the mixture with mixing to reach an optimum pH in the range of 3.5.0 to 5.0, (depends on properties required), to give a product referred to as hydrophobic nanocellulose fiber (HNCF) or hydrophobic microfibrillated cellulose (HMFC).

Suspension may be diluted or concentrated to suit the method of surface application.

After the HNCF or HMFC or their suitable combinations suspension is applied to substrate the water is removed through combination of evaporation, heat, vacuum, pressing.

An embodiment disclosed herein is composition, comprising;

an aqueous component, a hydrophobic complex comprised of a multivalent metal salt complexed with nanocellulose fibers and lignin, the composition exhibiting a viscosity sufficient to prevent coalescing and settling of the hydrophobic complex in the aqueous component.

In another embodiment disclosed herein there is provided a method of producing a stable suspension, comprising:

mixing nanocellulose fibers in an aqueous solution along with solubilized lignin with a multivalent metal salt under conditions suitable for the solubilized lignin and the solubilized lignin to form a hydrophobic nanocellulose fiber complex to give a suspension of the hydrophobic nanocellulose fiber complex in aqueous exhibiting a viscosity sufficient to prevent coalescing and settling of the hydrophobic complex in the aqueous component such that the hydrophobic nanocellulose fiber complex exhibits stability in the aqueous solution.

In another embodiment disclosed herein there is provided a method of producing a hydrophobic surface, comprising;

applying a composition to a surface of an article, the composition comprising an aqueous component, a hydrophobic complex formed by a multivalent metal salt complexed with nanocellulose fibers and solubilized lignin, the composition exhibiting a viscosity sufficient to prevent coalescing and settling of the hydrophobic complex in the aqueous component; and spreading the composition to form a wet film covering the surface and dewatering the wet film to produce a dried coating.

A further understanding of the functional and advantageous aspects of the disclosure can be realized by reference to the following detailed description and drawings.

BRIEF DESCRIPTION OF THE DRAWINGS

The patent or application file contains at least one drawing executed in color. Copies of this patent or application publication with color drawings will be provided by the Office upon request and payment of the necessary fee.

Embodiments will now be described, by way of example only, with reference to the drawings, in which:

FIG. 1 is an optical photograph showing stable colloidal solutions of unmodified and modified nanocellulose fiber. These solutions remained stable and had no visible settling after 6 months.

FIG. 2 is an optical photograph showing the Tyndall effect in 5 dilute solutions. Tyndall effect is the scattering of light as a beam of light passes through a suspension of particles. In a true solution, the beam of light will not be visible in the solution, as illustrated in both the sodium hydroxide solution and the lignin only solution. The lignin only solution does show a slight scattering which represents a very fine particle suspension. In the lignin-NCF10 dilute solution a large tyndall cone can be seen indicating larger colloidal particles. This solution has some settling of the larger particles occurring as can be observed at the bottom of the vial. The lignin-NCF90 dilute solution has a large tyndall cone and no settling, as does the NCF only solution. Illustrating stable colloidal suspensions.

FIG. 3 is one of the molecular structures that results from dissolving aluminum salt in aqueous medium. Hydrated trivalent aluminum cations exist primarily at pH less than 3. At pH from 4 to 5 the aluminum hydrolyzes and forms soluble hydroxo-aluminum complex species, as illustrated here. At pH over 5 the insoluble aluminum hydroxide ion predominates. It is the highly soluble hydroxo-aluminum complex which acts to bond insoluble lignin particles to the nanocellulose fiber.

FIG. 4 is the reversible acid-base reactions of lignin molecules. Lignin is highly soluble in base and insoluble in acid.

FIG. 5 is the reaction of alum with sodium hydroxide. At pH between 4-5 the concentration of the soluble aluminum complex is at a maximum as compared to other aluminum molecules (Hayden and Rubin 1974).

FIG. 6 is the proposed reaction of the cationic alum complex with the anionic lignin molecules.

FIG. 7 is the proposed structure of the hydrophobic nanocellulose fiber (HNCF). The lignin bonds to the cellulose through the cationic alum complex that can also bond to the anionic nanocellulose fiber through ionic, coordinated covalent and van der Walls bonding.

FIG. 8 are a series of optical micrographs of freeze dried nanocellulose-lignin mixtures (1-10). These images illustrate the physical behavior of the lignin-nanocellulose complex. In formulations 2 through 4 the particles are distinct and have no interaction. This is caused by a complete coverage of the nanocellulose fiber with the lignin-alum complex. In solution 4, at the ratio of lignin to nanocellulose of (100:1), 100 grams of lignin coat 100 $m^2$ (1 g) of nanocellulose fiber. Extension of this relationship, only 0.1 g of lignin would be required to cover 1 g of pulp fiber, due to the smaller surface of 0.1 $m^2$/g.

In formulation #5 there is incomplete coverage of the nanocellulose fiber by lignin and hence there are hydroxyl groups available on the NCF for binding to other NCF surfaces. Similar trend can be observed in formulations #6 through #8, where there is a smaller ratio of lignin to nanocellulose fiber, resulting in good interaction and subsequent film formation as well as the ability to bond to secondary cellulosic surfaces.

FIG. 9 is a bar graph showing the conductivity of the 10 solutions. The high conductivity of solutions 1 through 4 illustrates high concentration of free ions in solution. With reduction in the ratio of lignin to nanocellulose fiber as in solutions 5 and 6, it is illustrated that the conductivity and hence ion concentration decrease to very low value. This indicates that the lignin molecules have been bound up on the nanocellulose fiber and are no longer available as free ions in solution.

FIG. 10 is a bar graph showing the zeta potential of the 10 solutions. The highly negative zeta potential of solutions 1 and 10 illustrates the stability of the colloidal dispersions of the two reacting solutions. When the two colloidal dispersions are combined in various proportions the zeta potential becomes less negative, indicating that there is interaction between the particles in the solution. With low zeta potential it would be expected that there would be rapid coagulation in the solutions, but the high viscosity and particle geometry prevents this from occurring.

FIG. 11 is a plot comparing the change in contact angle of a water drop on handsheets made from HNCF and hydrophobic kraft fiber.

FIG. 12 shows examples of bonds formed between lignin and an alum complex.

FIG. 13 is a plot of water absorption in handsheets made from recycled pulp slurry with addition of i) nanocellulose fiber (NCF) and ii) hydrophobic nanocellulose fiber (HNCF) over a period of 8 days. The percent of water absorption by the hand sheet is very rapid for the pulp slurry and the pulp slurry with 1% NCF addition. The sample of pulp with 1% HNCF addition has a low initial water absorption (less than 40% of its original dry weight) and equilibrates to a level of between 70%-80%.

FIG. 14 is a plot of water absorption in handsheets made from recycled pulp slurry with addition of 0.1%, 0.25%, 0.5% and 1% of HNCF. Even at very low addition rate of HNCF to recycled pulp fiber there is a large reduction in water absorption by the handsheet, illustrating the beneficial effect of HNCF addition on the water absorption by the handsheet.

FIG. 15 is a photograph of a handsheet made with addition of lignin and alum to pulp slurry (no HNCF) as compared to handsheet made with pulp slurry and addition of 1% HNCF. In handsheet with no NCF the lignin precipitated and coagulated into particles that can be readily seen in the handsheet. The handsheet with no HNCF exhibited very high water absorption.

FIG. 16 is a plot showing the change in contact angle of a water drop placed on a handsheet of pulp slurry only, pulp slurry+1% NCF, pulp slurry with addition of lignin and alum (no NCF) and pulp slurry+1% HNCF. The handsheet with the 1% HNCF showed a very gradual decrease in the contact angle as opposed to much faster decrease in contact angle with all other handsheets.

FIG. 17 is a photograph of an unmodified NCF film and HNCF film.

FIG. 18 is a photograph of an unmodified NCF film and films from HNCF with varying degrees of hydrophobicity.

FIG. 19 is a bar graph showing the dry and wet tensile index of films made with various levels of lignin addition to NCF and three levels of final pH's. Higher dry strength is observed with lower alum addition (ie higher final pH). Wet strength of the films with lignin addition is higher than the control film containing no lignin.

FIG. 20 is a plot showing the change in contact angle of a water drop placed on a film over time. HNCF films with 1% lignin addition and various levels of alum addition are depicted. The higher initial contact angle of the HNCF films over the NCF film can illustrates its increased hydrophobicity. Also, the rate of change in contact angle over time is less for the HNCF films as compared to the NCF film.

FIG. 21 is a plot showing the change in contact angle of a water drop placed on a film over time. HNCF films with 5% lignin addition and various levels of alum addition are depicted. The higher initial contact angle of the HNCF films over the NCF film can illustrates its increased hydrophobicity. Also, the rate of change in contact angle over time is less for the HNCF films as compared to the NCF film.

FIG. 22 is a plot showing the change in contact angle of a water drop placed on a film over time. HNCF films with 10% lignin addition and various levels of alum addition are depicted. The higher initial contact angle of the HNCF films over the NCF film can illustrates its increased hydrophobicity. Also, the rate of change in contact angle over time is less for the HNCF films as compared to the NCF film.

FIG. 23 is a photograph of a magnified water drop on a) NCF film b) HNCF film. A comparison of the contact angle of the two materials at same time.

FIG. 24 is a photograph of the experimental set-up for the water vapour transmission reate evaluation (WVTR). Samples evaluated are (1 blank, 2 HNCF (1% low pH), 3 HNCF (5% low pH), 4 HNCF (10% low pH), 5 copy paper, 6 empty container).

FIG. 25 is a photograph of HNCF coated evaluated according to TAPPI T 454 "Turpentine Test for Voids in Glassine and Greaseproof Papers". No penetration of the oil through the HNCF coated paper was observed after maximum test time of 30 minutes.

FIG. 26 is a plot showing the change in contact angle of a water drop placed on a HNCF spray coated paper, over time. At higher weight of coating (8.2 g/m^2), the coating created an effective barrier to water. At lower coat weight, 3.1 g/m^2 there was insufficient HNCF coating to protected the paper substrate and the water was rapidly absorbed.

FIG. 27 is a plot showing the change in contact angle of a water drop placed on a HNCF roll coated paper, over time. The coating of HNCF increased the hydrophobicity of the paper substrate (blank).

FIG. 28 is a photograph of a prototype coffee cup lid spray coated with HNCF to make it water and grease resistant.

FIG. 29 is a photograph of a prototype food tray; a) side view of tray showing coating on the inside surface only, d) water holding capability of spray coated tray.

FIG. 30 is a photograph of HNCF spray coated copy paper. The HNCF coating has high surface energy and provides and impervious barrier to water drops. The HNCF coating is applied to wood surface and provides same excellent barrier properties.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof" mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

As used herein, the phrase "nanocellulose fibers (NCF) and derivatives thereof" or "nanocellulose particles (NCP) and derivatives thereof" means very small cellulose fibers having a diameter in a range from about 1 to about 90 nanometers, and an aspect ratio typically about ten (10) to one thousand (1000) times the diameter of the fiber. A more preferable range of diameters is between 5 to 40 nanometers with same range for the aspect ratio. The nanocellulose fibers may have a variable crystalline and amorphous content so that the fibers may be substantially all crystalline or a mixture of crystalline and amorphous regions. In NCFs crystallinity may vary between 55% to 95% depending on the nature of their isolation process. Nanocellulose fiber is defined as nano-sized cellulosic substrates obtained by extraction of cellulosic substrates through acid hydrolysis, or mechanical treatment or via bacterial synthesis. As used herein, the phrase "micro cellulose fibers (MCF) and derivatives thereof" and derivatives thereof" means thin cellulose fibers having a diameter in a range from about 0.1 to about 20 microns, and an aspect ratio typically about ten (10) to one thousand (1000) times the diameter of the fiber. A more preferable range of diameters is between 0.1 to 5 microns with same range for the aspect ratio. Normal cellulose fibers have diameters in a range from about 20,000 to about 60,000 nanometers and typical aspect ratio of about fifty (50).

Derivatives of NCFs and MCFs are chemically or physically modified entities of NCFs and MCFs containing chemical functional groups other than hydroxyl groups;

typically they also contain acetyl, carboxylic, sulfonic, amino and other chemical groups attached to NCFs and MCFs.

Thus, as used herein, whenever the phrase "nanocellulose fiber" is used, it refers to nanocellulose fibers themselves, or derivatives of nanocellulose fibers, or mixtures of nanocellulose fibers with derivatives of nanocellulose fibers.

As used herein, lignin and derivatives thereof means a 3-dimensional, cross-linked polymer of aromatic alcohols. Lignin or lignin derivative is obtained from herbaceous plants, woody plants, or materials which have been partially degraded, either directly or extracted through mechanical treatments, chemical treatment, enzymatic treatments, thermal treatment or combinations of the aforementioned treatments or though biorefining methods such as soda pulping, kraft pulping, sulfate pulping, thermomechanical pulping, chemi-mechanical pulping, organosolve pulping, enzymatic pulping, steam explosion and groundwood pulping. Herbaceous and woody plants include, forest materials and residue including wood, bark and foliage from hardwood and softwood species, agricultural materials and residues and their pre- and post-consumer waste materials including corn stover, rice husks, wheat straw, bagasse, grasses, bamboo, sawdust, wood chips, wood particles, paper as examples and partially degraded biomass materials including peat moss and material digested by from enzymatic or microbial processes and/or the mixture of them in any combination.

Thus, as used herein, whenever the phrase "lignin" is used, it refers to lignin alone, or derivatives of lignin, or mixtures of lignin alone with derivatives of lignin. The lignin may vary chemically or physically to any molecular weight or structure and may be in solid or liquid state. For instance the number of functional groups such as carboxyl groups, amines, amides, sulfonates and nitrogroups may decrease or increase through modification processes. The changes of functional groups may occur through any reactions such as oxidation by hydrogen peroxide, oxygen, ozone or any oxidation reagents, oxoammonolysis, polymerization, electrochemical or enzymatic reactions. In other type of modification, organic or inorganic molecules may graft to the lignin structure through etherification or esterification. The lignin or lignin derivatives may be subject to chemical changes before precipitation with multivalent metal salts or on dissolution in alkaline.

The process disclosed herein for increasing hydrophobicity of the surfaces of nanocellulose fibers (HNCF) achieves this through a "green" chemistry process. Such particles include MCF, NCF, NCC and bacterial cellulose, from herein called nanocellulose fiber (NCF) and all other lignocellulosic fiber from plant or animal origin. The non-polluting, green compositions disclosed herein are particularly, but not exclusively suitable for bio-based coating for lignocellulosic materials, including but not limited to paper, wood, cotton as well as glass and plastic.

The compositions disclosed herein comprises a stable colloidal suspension of hydrophobic nanocellulose fiber (HNCF) in aqueous medium. The aqueous medium can be water or mixtures of miscible solvents and water. Preferred HNCF compositions of this disclosure range from colloidal suspensions of the HNCF in aqueous medium formed by adding about 99.5% lignin by weight to about 0.5% NCF by weight to colloidal suspension of about 1% lignin by weight to about 99% NCF by weight, see Table 1. The amount of aluminum sulphate or other acid salts or inorganic or organic acids added is optimized at pH of about 4 to about 4.5 but can be added to pH levels of about 2 to about 7.5.

Stability of the suspensions were assessed by uniformity of solid concentration in the top, middle and bottom layers of the suspension after 5 weeks, see Table 2, and FIG. 1. The suspensions, held in 50 ml centrifuge tubes, were left undisturbed for 5 weeks at room temperature after which time, a top, middle and bottom layer were separately removed, weighed, dried and re-weighed. Five grams from the top of the tube was removed, 30 grams from the middle layer was next removed and finally the remaining bottom layer was removed. All samples were dried for 24 hours at 105° C. to find weight of the solid residue and the concentration on a w/w % basis. The lack of significant difference in concentration between the three layers indicated that no settling of the HNCF colloids occurs over the 5 week period.

Referring to FIG. 2, the Tyndall effect of the solution was evaluated to determine whether the mixtures are suspensions, colloidal or true solutions. The solutions described in Table 1 were diluted at a 1:100 ratio with water. Tyndall effect is the scattering of light as a beam of light passes through a suspension of particles. In a true solution, the beam of light will not be visible in the solution, as illustrated in both the sodium hydroxide solution and the lignin only (solution #1) dilute solution. The lignin only solution does show a slight scattering which represents a very fine particle suspension. In the lignin-NCF10 (solution #5) dilute solution a large tyndall cone can be seen indicating larger colloidal particles. This solution has some settling of the larger particles occurring as can be observed at the bottom of the vial. The lignin-NCF90 (solution #7) dilute solution has a large tyndall cone and no settling, as does the NCF (solution #10) dilute solution. Illustrating stable colloidal suspensions.

Referring to FIG. 3, the complexing of the NCF with lignin through addition of a cationic moiety such as the aluminum ion complex creates a solution with unique properties. The properties of the solution is attributed to the high number of chemical bonding sites available on the NCFs due to the extensive surface area and thus the high number of hydroxyl/carbonyl groups available for lignin molecules in solution to complex with on the surface of the NCF through the cationic moiety. The surface area of NCF with average diameter of 30 nm is 100 $m^2/g$, about 1000 times the surface area of normal pulp fiber with a surface area of approximately 0.1 $m^2/g$. It will be appreciated that the very high number of binding sites obtained with these NCFs is due to the fact that they have a very high aspect ratio and surface area compared to typical or convention cellulose or pulp fibers. The NCFs are able to bind to also bond to other NCFs since they possess many more and accessible binding sites (compared to typical cellulose fibers) and due to their small dimensions, which are much less than the wavelength of visible length, they are highly transparent and can form transparent films when applied to surfaces as light will not be reflected from the film. For these reasons one cannot achieve films of this nature with typical cellulose or pulp fibers.

The presence of the very high number of hydroxyl groups on the NCFs which have polar charges, still available after the HNCF structures has been produced, facilitate the HNCF complex binding to other substrates, thus allowing them to be used to form low porosity, transparent, highly hydrophobic and lypophobic coatings exhibiting excellent adhesion which are dense and compact with no apparent porosity. In contrast, a complex formed with lignin, the alum complex and convention cellulose fibers is characterized by the cellulose fiber having a far smaller number of hydroxyl with the result that very few are available to bind the complex to substrates. In other words the properties of the HNCFs produced in accordance with the present disclosure are very different from complexes formed with conventional cellulose fiber.

Another significant and key advantage of the HNCFs produced as disclosed herein is the fact that the HNCFs remain stably disbursed in aqueous solution even though they form highly hydrophobic coatings. This is very advantageous as it gives the aqueous solutions of the HNCFs a very long shelf-life. The solution is also non-toxic and easy to apply as coating producing no fumes.

To make the HNCF aqueous solution, a soluble lignin solution is used which can be made by dissolving lignin in a sodium hydroxide solution. Referring to FIG. 4, lignin is soluble in alkali because its phenolic hydroxyl groups are easily oxidized in alkali solution. The solubility of wheat straw lignin in alkali can be seen in Table 3. A solution was made by dissolving 2.0 g lignin powder in 30 mL of NaOH (0.1 M) and mixing with high agitation for up to 90 minutes. The solution characteristics were monitored for the duration of the test and are as shown in Table 3. The lignin concentration in caustic solution can be between 0.1% and 99% by weight but is normally between 20-25 w/w %. The lignin and lignin derivatives in solution can have a pH between 7 to 14, but is preferable to be between 8 to 12. The solution can contain soluble and/or colloidal and/or solid forms of lignin and alkali solvents such as sodium hydroxide, potassium hydroxide, ammonium hydroxide, barium hydroxide, calcium hydroxide, magnesium hydroxide and like at 5 to 45%, and preferably 8-12% sodium hydroxide based on the total mass of lignin.

It can be seen that the alkali lignin biopolymer solution (Table 1-Solution #1) is made up from charged lignin polymer fragments and has properties similar to a weak polyelectrolyte solution as evidenced by the high electric conductivity (14,797 (μs/cm)). However, unlike most polyelectrolyte solutions it does not have a high viscosity as the relatively low molecular weight of the lignin molecules in solution appear to be have a non-swelled structure. The very low viscosity is influenced by the relatively high electrostatic repulsion in the solution as measure by the high zeta potential of −36.9 mV, and may be created from the high charge of the phenolic hydroxyl groups. Zeta potential in excess of +/−30 mV is considered a threshold value for stability. In FIG. 2, row 1 the alkali lignin, solution 1, is shown to be a stable colloidal suspension.

A solution containing a 1% colloidal suspension of NCF in water can be seen as—Solution #10 and FIG. 2—row 4. This is known as a colloidal suspension because the insoluble NCF have one dimension less than 1000 nm, which qualifies them as colloidal particles. In the case of NCF, the diameter of the particles are generally less than 50 nm and can be 1 um or longer in length. The NCF suspension is obviously non-ionic in water as indicated by its very low charge (23 (μs/cm)) but has high viscosity because the NCF are highly hydrophilic and swell in the water medium. The NCF fibers are very long in comparison to their diameter and contain many accessible hydroxyl groups which contribute to entanglement of the fibers in addition to possessing short range van der waal attractive forces, all of which contribute to reduced mobility of the particles. Even though the solution has a high negative zeta potential of −26.9 which means it has a high electrostatic repulsion due to strong electrostatic charge amongst the particles, this influence on the solution viscosity is somewhat over-ridden by the shape/size and strong interaction of the NCF particles, hence the high solution viscosity (1593 cp).

In the second step of the process a solution of NCF and a solution of soluble lignin are added together and sufficiently mixed. After adequate mixing time, a complex metal ion (can be alumimum sulphate) is added to the solution at specified amount, as determined by an optimum final pH of about 4.0 to about 4.5. At this pH level, aluminum ions in water give rise to a high concentration of $Al(H_2O)_6^{3+}$ complexes, see FIG. 3.

As can be seen in Table 1—solution #9, when alum is added to NCF-only solution the zeta potential decreases from −26.9 mV to −8.8 mV, and when alum is added to the lignin-only solution (Table 1—solution #2) the zeta potential decreases from −36.9 mV to −0.5 mV. This illustrates that the aluminum salt masks some of the negative charge in both these systems, causing reductions of the zeta potential in both solutions. In the lignin-only (solution #2) system the aluminum salt addition results in an iso-electric zeta potential for the system, which allows the particles to come together and significantly increases the viscosity. For the NCF only (solution #9) the addition of aluminum salt causes a decrease in the zeta potential by masking some of the negative charge in the system. However, in this system there is still enough repulsion between the fibers to prevent the mass association of the particles. In this case the reduction in the zeta potential actually decreases the viscosity of the system and allows it to be more free flowing.

In the preparation of the HNCF solution, the alum can be added after the NCF is mixed with the alkali lignin solution. The alum reacts in alkali to form a number of ions with one of the most important being represented in FIG. 5. Since, both the NCF and lignin molecules are negatively charged, they are attracted to and can bond to the positively charged aluminum complex ion. When aluminum sulphate is introduced into the alkali solution containing the NCF and the lignin (solutions 3-8), the alum reacts as in FIG. 5 to form the positively charged ion complex. With lignin present in the solution, a complex structure is then formed by formation of coordinate bond between aluminum ion complex and two free electrons from phenol in lignin macromolecule, which now act as hydrophobic ligands on the alum complex, see FIG. 6. The NCF can also bond to the alum complex through hydrogen or coordinate covalent bonding, see FIG. 7.

The absorption of the alumimum-lignin complex onto the NCF is through oxidized groups on the cellulose molecule. The number of complexes that can be absorbed depends on the surface area and the number of hydroxyl and carboxyl groups as created by the surface area of the NCF. The surface area of NCF is 1000 times higher than the cellulosic wood fiber from which it was derived. The pre-treatment of the NCF at alkali conditions enhance surface area by swelling the NCF and also increasing the oxidized sites. The oxidized sites are comprised of a mixture of 1) oxidation of primary alcohol groups (i.e., C6 to aldehyde or carboxyl group), 2) oxidation of secondary alcohol groups (C2 and/or C3 to aldehyde or carboxyl group with attendant cleavage of carbon-to-carbon bond) and less common 3) oxidation of the hemiacetal groups (C1 to carboxyl groups). Prior art has demonstrated that the absorption of aluminum on cellulose is at a maximum when pH is between 4-5 due to an ion exchange mechanism at the carboxyl sites with polynuclear species, $Al_8(OH)_{10}(SO_4)_5^{4+}$ and $Al^{3+}$, (Arnson 1980).

The combination of these two components; hydrophobic polymer (lignin) in compact form and NCF (hydrophilic polymer in extended conformation), at optimum ratios, results in a solution which is close to the iso-electric point but does not flocculate because of the high viscosity and the strong short range associated structure formed with the hydrophobic lignin molecule extending into the dispersion medium. This very advantageously gives the aqueous HNCF solution a very stable shelf life. The new copolymer formed, HNCF, contains both hydrophobic and hydrophilic segments and self assembles in solution to form specific aggregates at specific pH values.

FIG. 8 shows microscopic images of freeze dried samples, of solutions 1 through 10, illustrating the physical behavior of the lignin-NCF complex. In formulations #2-#4 it can be seen that the particles are separate due to very low interaction between them. This is because the NCF surface reactive groups are completely or almost completely covered by lignin molecules, therefore the NCF have no ability to form hydrogen bonds with one another. For example, in formulation #4, 100 g of lignin almost entirely cover 1 g NCF which means 100 g lignin covers 100 $m^2$ of NCF surface area (or 1 g lignin covers 1 $m^2$). This is unlike the case for normal pulp fiber, where the much smaller surface area (0.1 $m^2/g$) would suggest that 1 g of pulp fiber could only bond to 0.1 g of lignin. Therefore the NCF is superior to pulp fiber at carrying a higher amount lignin molecules.

In formulations where there is a lesser degree of surface coverage of the NCF by the lignin alum complex, some of the hydroxyl groups of the NCF remain free for bonding to each other or to other secondary surfaces (cellulosic or other), FIG. 8, solutions #6 to #8. Images for solutions #6 to #8 show that the modified fibers are bonding to each other and forming a film. Fibers in formulations #6 to #8 have good interaction because the high number of OH group make a strong bond between the NCF fibers and also to the surface of other fiber surfaces. Therefore, formulations #4 to #6 are suitable for modifying pulp fibers, and more importantly formulation #6 to #8 are suitable for coating the surface of substrates such as paper, cotton, glass, etc.

Referring to FIG. 9, the conductivity of the solutions #3 to #7 show a change from a maximum (18010 μs/cm) to a minimum (469 μs/cm) conductivity, where the solution goes from containing high amount of charged ions in solution to a minimum, where there are few charged ions in solution that can contribute to the conductivity. As the proportion of NCF to lignin increases (solution 3 to 8), it can be noted that the conductivity of the solution decreases. This illustrates that the ions are becoming attached to the NCF and are no longer free ions in solution. For example, in solution 5 where there is 90% lignin to 10% NCF, the conductivity remains high (11,550 μs/cm) indicating that there is still large amount of free ions in solution and that the bonding sites on the NCF are fully covered by lignin. Wherein, for solution #7, the conductivity is low, indicating low amount of free ions in solution, meaning that the lignin-alum complex is fully taken up by the NCF.

Referring to FIG. 10, solutions 2 to 5 have a very low zeta potential which indicates that there is no difference in the charge between the bulk solution and the particle's total charge. With no zeta potential in the solution the particles can have a tendency to come together and hence viscosity of the solution increases. Solutions 6 to 8 have a negative zeta potential giving the particles sufficient repulsive charge to keep them suspended in the solution and thereby maintain lower viscosity. These solution characteristics are advantageous for long stable shelf life, and for solution rheology which allows for ease of application.

Referring to FIG. 11 it was demonstrated that the NCF absorbs proportionally more of the lignin-alum complex because of its greater surface area and available bonding sites, than a normal kraft pulp fiber. Sample handsheets were made using kraft fiber plus 10% by weight lignin then alum was added to pH of 4.2. Another sample handsheets was prepared from NCF fiber (made from the same kraft fiber as above) plus 10% by weight lignin then alum was added to pH of 4.2. The results shown in FIG. 11 illustrate that the handsheet made from kraft fiber had a higher contact angle and lower work of adhesion than the sample made with the HNCF. This can be explained by the fact that bonding sites on the kraft pulp fiber were completely covered groups that remain unbounded to the lignin-alum complex and were still available due to its higher surface area, making the sample sheet less hydrophobic.

Referring to Table 12, a comparison between solutions comprised of NCF, HNCF, kraft fiber and hydrophobic kraft fiber. The properties of the NCF (#10) and kraft fiber (#12) are similar in conductivity, zeta potential, but possess very different viscosity due to particle geometry. A similar comparison can be made between the HNCF and the hydrophobic kraft fiber, however in this case, while the conductivity of the two solutions are similar, the zeta potential and the viscosity are quite different. The higher zeta in the HNCF than in the hydrophobic kraft solution, as well as the particle geometry of the NCF is what contributes to the stable suspension, of the HNCF solution.

It is illustrated in FIG. 10, that addition of alum to the lignin causes a reduction in the solution zeta potential to almost 0. The low zeta potential of the solution suggests that the lignin particles that were quite stable in solution prior to alum addition (solutions 1 and 2) will now floc together. The same can be seen in the change of the zeta potential of the NCF solution and the NCF solution with addition of alum (solutions 10 and 9). However, even with reduced zeta potential in the solution, the NCF does not floc together because of the shape of the fiber and the high viscosity of the solution. This demonstrates that the trivalent and quadravalent cations of alum interact with both the lignin particles as well as the NCF. It is thus through the alum bridge that the HNCF are formed. The level of addition of lignin to the NCF determines the properties of the functionalized fiber. Therefore the resulting HNCF entity has some of its polar sites complexed to the lignin molecule with others unoccupied and available for electrostatic bonding referring to FIG. 9, photos 6-9. The higher the lignin-alum loading on the NCF, the higher the hydrophobicity. Less adsorption of the lignin-alum complex gives higher film strength.

The lignin-alum solution, Table 1, solution #2 is strongly ionic with a conductivity of around 17,463 μs/cm, which suggests that there are many ionic species of lignin and alum in the solution. The NCF has very high specific area (at least 1000 times higher than conventional cellulose pulp fiber) with negative charge. The lignin molecules in solution can complex to the alum molecules with a covalent bond to a hydroxyl oxygen and also with a coordinate bond with another oxygen atom. Examples of these bonds are seen in FIG. 12. It is important to have a ratio of lignin to alum that is not too high, as this may bind up all the alum sites and have reduced positive charge remaining for formation of ionic bond/electrostatic bond with the hydroxyl/carboxyl group on the NCF.

The following non-limiting examples of the process and products disclosed herein will now be discussed.

EXAMPLES

Example 1

I) Effect of Adding of 1% NCF and 1% HNCF to a Pulp Slurry on Water Absorption of Handsheet.

A slurry of recycle paper fiber was prepared by re-pulping 60% by weight of commercial copy paper and 40% by weight of brown wrapping paper at a 3.2% consistency in water using in a high intensity mixer for 1 hour. 400 g of slurry (approx. 15 g dry fiber) was disintegrating for 5 minutes with 1500 ml water to make a 1% w/v mixture.

Modified NCF (HNCF) were prepared by mixing 10 parts lignin by weight to 1 part NCF based on dry weight (from a 0.25% solution). Alum was added to the solution to bring the solution to a pH below 5. The composition of the handsheets can be seen in Table 4. The HNCF was added to the pulp slurry and mixed for 10 minutes. 800 g/m² pulp sheets were formed in an a Butchner funnel (0.0211 m²) with vacuum. Sheets were pressed for 5 minutes in a sheet press at 50 psi then dried in oven for 1.5 h at 105° C. It should be noted that the color of the filtrate from the sheet making process is indicative of the retention of all components. Since no color was seen in the Pulp slurry+1% HNCF, all or mostly all lignin was retained in the handsheet.

The water uptake/water absorption of the handsheets were measured. Samples were cut from the handsheets of approximate dimensions (5.00×5.00×1.00 cm³). The samples were conditioned at room temperature until a constant weight was reached prior to the immersion in a static deionized water bath. The specimens were periodically taken out of the water, wiped with tissue paper to remove surface water, weighed and immediately returned to the water bath. The water absorption test was carried out over a 7 day period. The amount of water absorbed in the samples was calculated by the weight difference between the samples exposed to water and the original sample weight. Water absorption (WA) was calculated according to the following formula $$WA(\%) = \frac{(Me - Mo)}{Mo} \times 100$$

where $M_e$ is the mass of the sample after immersion (g); $M_o$ is the mass of the sample before immersion (g). Referring to FIG. 13, significant difference in the initial rate of water of absorption was found between the handsheet made from HNCF and NCF. Within the first hours the HNCF had a water absorption of 37.5%, compared to the handsheet with 1% NCF at 125%.

Example 2

2) Effect of Addition of NCF and Various Levels of HNCF to a Pulp Slurry on Water Absorption of Handsheet.

Pulp sheets were prepared as in Example 1, above, at a grammage of 502 g/m², Table 5. Referring to FIG. 14, a plot of water absorption by handsheets made from pulp slurry with; i) no addition of HNCF/NCF and ii) various levels of HNCF addition (0.25%, 0.5% and 1% of HNCF), over a 7 day period. The percent water absorption by the handsheet made from pulp slurry with lignin but no NCF, is very rapid. The handsheet comprised of pulp to which 1% HNCF was added, has a relatively low initial water absorption (less than 40% of its original conditioned weight) and equilibrates to a level of about 60%. Even at very low proportion of HNCF to pulp fiber the HNCF has a large beneficial effect on reducing water absorption by the handsheet by retaining a stable solution of ligin prior to addition to the pulp slurry.

The results shown in FIG. 14 demonstrate the capability of very small amounts of HNCF (0.1% on pulp) to serve as a carrier of lignin which can then impart water resistance to the other fiber, while maintaining their ability to enhance strength of the pulp fiber network. The "No HNCF" sample was prepared in same proportions with only the absence of the NCF fiber to act as lignin carrier. The "No HNCF" handsheet had no enhanced water resistance and immediately absorbed water on submersion. FIG. 15 is a photograph of the "No HNCF" handsheet showing that large dark agglomerated particles in the pulp sheet, indicating that there is no uniform distribution of the chemicals on the fiber surface without the use of the HNCF in the formulation.

The static contact angle of the above samples were determined by measuring the angle between the tangent and baseline from curve fitting of a water drop on the surface of the samples, Pulp slurry only, Pulp slurry+1% NCF, No HNCF, 1% HNCF, see FIG. 16. The static contact angle was measured using a Spinder & Hoyer telescope (Germany). A 1 µL water drop was dropped from a pipette tip onto the surface of the sample. Images of the drop were captured within the first minute and for the next 40 minutes. The contact angle was measured on three drops for each surface. The reproducibility of contact angle measurement on different samples prepared in the same way was ±5° or less. Surface tension of the water at 27° C. was taken as $\gamma=72.0$ $mNm^{-1}$.

The work of adhesion between the solid surface and liquid probe was measured for the samples. Work of adhesion (WA) is the work required to separate the liquid and solid phases, or the negative free energy associated with the adhesion of the solid and liquid phases. It is clear from the results displayed in Table 6 that the work of adhesion between water and the pulp handsheet with addition of 1% HNCF is lower than for the samples that exhibited little or no hydrophobic characteristics, such as the pulp slurry. Work of adhesion is used to express the strength of the interaction between the two phases.

$$W_A = \gamma_1(1 + \cos \theta)$$

Example 3

3) Water Vapour Transmission Rate of HNCF Films.

NCF films have been widely investigated (Syverud 2009) and newly developed industrial processes are close at hand. The good mechanical properties of the films, due to their high surface area and vast amount of hydroxyl groups available for H-bonding, as well as the nanoscale pores have lead researchers to surmise that the films will provide unique properties favourable for barrier applications, especially in food packaging application. One of the main challenges which remains to be resolved until now is the hydrophilic nature of the MFC/NCF films (Lavoine 2012) and its poor barrier properties against water vapor (Spence, 2010). Some investigators have attempted to use relatively unrefined natural fiber for MFC production in the hopes that the lignin containing fiber would provide improved barrier properties. The results, in fact, showed inferior water vapour barrier properties with higher lignin content, hypothesized to be due to large hydrophobic pores in the film. Proposed applications for HNCF films include transparent films for food packaging, electronic packaging, etc.

Referring to FIGS. 17 and 18, films of HNCF were made using an NCF suspensions of 1% with 0, 1, 5, & 10% weight of lignin to weight of NCF, Table 7. pH was adjusted by addition of aluminum sulphate. Sheets were prepared with acetate paper in butchner funnel and vacuum. Sheets were pressed in a sheet press at 50 psi for 5 min. The pressed sheets were then dried at 105° C. for 1.5 hours. Sheets were pressed with iron bar during the last 1 hour of the drying. Sheets were conditioned at ambient temperature and humidity, overnight before proceeding with testing. The darker color in the films indicates a high retention of lignin.

The tensile index of the HNCF films is higher for the group of samples which have a high final pH level (<5.5) at all lignin percentages (1, 5 and 10%), FIG. 19. This indicates that less of the NCF sites are occupied with the lignin and therefore more H-bonding has taken place between the NCF through the unoccupied hydroxyl groups and the alum cations. For the samples with lower pH, therefore higher alum to lignin & NCF ratio, it can be seen that the tensile index is about the same as it is for the NCF-only films.

On the other hand, the hydrophobicity of the films is better with lower final pH. This can be seen for the three lignin-loadings of 1%, 5% and 10%, as shown in FIGS. 20, 21 and 22 respectively. Also the large improvement in hydrophobicity of all three HNCF films over the NCF-only film can be seen. This observation is verified in Table 8, Table showing the reduced work of adhesion between the water drop and the HNCF versus NCF film. FIG. 23 shows a photograph of the contact angle of a water drop on the surface of NCF film and the 10% HNCF film.

NCF films have been noted for their low air permeability because of the tight bonding of the fibrils resulting in few or no connected pores through the cross-section of the films (Syverud, 2009). Hence the method in which the film is produced is very important in ensuring a tight fibril network with few connecting pores. However, it has been noted that NCF films do not demonstrate the same superior property with respect to water vapour transmission because of their hydrophillicity and their affinity for absorbing water molecules, thus decreasing the diffusion time through the film.

Water vapor transmission rate is affected by both the physical structure of the NCF film (especially thickness and density) and its chemical composition. The less hydrophilic material that is contained in the film, the longer will be the diffusion path for the water vapor molecule, and hence a lower water vapor transmission. The water vapor transmission rate (WVTR) measures the amount of water transmitted through a material in unit time in the described environment of temperature and humidity. It is measured in change in weight/unit area/unit time. Referring to FIG. 24, water was placed in the container shown and sealed with the film to be evaluated. The experimental chamber was controlled to 50% humidity and 23° C. temperature. The results demonstrate that the higher the proportion of lignin, the longer the diffusion path for the water molecules to travel through the film and the lower the WVTR, as is shown in Table 9. Here it can be seen that the WVTR is slowest for the HNCF film that contains 10% lignin. This film show a 24% improvement over the NCF-only film.

Example 4

4) Amphiophobic Coating Application—Water and Grease Resistance

Paper is a popular bio-based material used in food packaging due to its excellent mechanical properties and biodegradability. Hence paper and paper products are being used in a range of food packaging for dry food, frozen food, beverages and some fresh foods (Hult, 2010). The hydrophilic nature of paper based products is a challenge for packaging food that are moist or contain high amounts of moisture, such as fresh fruits and vegetables or take-out food containers. In order to improve the barrier properties of paper, a thin layer of synthetic polymer such as PE, PP, and PVC is often used. According to a recent review by Lavoine et al. 2012, NCF coating on paper is virtually absent from the literature and the only work which attempts to improve the barrier properties of paper and paperboard used successive coatings of MFC and shellac (Hult, 2010). The shellac proved effective at reducing the water vapour transmission rate while the MFC had no influence due to its highly hydrophilic nature.

The pores in paper also create a challenge for grease barrier properties, as grease can rapidly find its way through the pore structure of most papers. Grease-proof papers have a very dense structure and can therefore provide a barrier to fats and oils. Other papers used for this purpose have a wax coating to serve as the oil barrier. The HNCF coating as applied by roll coater to a paper substrate was evaluated for its grease-proofness according to Tappi T454, see FIG. 25. The criteria which must be met for a successful verdict for the test is that there should be no penetration of the oil through the HNCF coated paper for at least 30 minutes. The HNCF coated was successful at preventing oil penetration for a period of well over 1 hour.

In this embodiment of the invention HNCF coating formulations were applied to a variety of paper substrates and their water repellency, grease (oil) resistance and WVTR were evaluated and showed marked improvement over paper substrate with no coating.

Example 5

5) HNCF Coating Prototypes

HNCF solutions were prepared and characterized for application as coating on hydrophilic paper substrates. By changing consistency of formulation, various application techniques proved very successful, i.e., Roll coating, spray coater and rod coater. Presented here are results from spray coating and roll coating. A thin layer of HNCF coating applied over a paper substrate significant improved the water resistance, grease resistance, and showed a lower work of adhesion with a water drop. This proves that both hydrophillicity and grease resistance are provided to the paper substrate through a thin layer HNCF coating. FIG. 26 shows the change in contact angle over time of a water drop of the surface of two HNCF spray coated samples. It can be seen that the sample with a coat weight of 8.2 g/m$^2$ has better hydrophobicity than the sample with a coat weight of 3.1 g/m$^2$, likely due to insufficient coverage of the paper substrate with the HNCF barrier coating. FIG. 27 shows the change in contact angle over time of a water drop on the surface of an HNCF roll coated sample with a coat weight of 12.1 g/m$^2$, demonstrating that a high degree of hydrophobicity was imparted to the paper substrate.

There are numerous applications where a bio-based grease and water resistant coating could be used to successful replace plastic products (polystyrene, polypropylene, polyethylene) such as can be seen in FIG. 28, FIG. 29 and FIG. 30. The HNCF coating has been applied successfully to a number of lignocellulosic and wood materials as can be seen in these photographs.

Summary

The present disclosure provides a composition, comprising an aqueous component, a hydrophobic complex comprised of a multivalent metal salt complexed with nanocellulose fibers and lignin, the composition exhibiting a viscosity sufficient to prevent coalescing and settling of the hydrophobic complex in the aqueous component.

A preferred multivalent metal salt is alum. However the multivalent metal salt may be a salt of a multivalent metal, the multivalent metal being selected from aluminum, potassium, sodium, calcium, cobalt, iron, manganese, zinc, chromium, copper, tin, cadmium, nickel, with combination of monoatomic or polyatomic ions, such as sulphate, phosphate, nitrate, chlorate, chloride like aluminum sulphate, poly aluminum chloride, ferric/ferrous sulphate, chloride and potassium sulphate.

The nanocellulose fibers may be solubilized nanocellulose fibers in a form of a slurry having a consistency of nanocellulose fiber slurry is between 0.001 to 5% w/w %, and more preferably from about 0.1 to about 2 w/w %.

The lignin is an aqueous mixture of lignin and lignin derivatives having a pH of the lignin solution is in a range from about 7 to about 14, and more preferably between about 8 to about 12.

Non-limiting examples of the aqueous component may include water, acetone in water, and alcohol in water to give a few examples. The hydrophobic complex may be present in the aqueous component in a range between about 0.01 w/w % to about 50 w/w %, and more preferably in an amount between about 0.1 w/w % to about 10 w/w %.

The compositions may have a pH in a range from about 2 to about 10, and more preferably in a range from about 3.0 to about 6.0.

Thus the stable compositions disclosed herein may be applied to the surfaces of many products, including but not limited to paper, paperboard, medium density fiberboard, hardboard, particleboard, lumber, laminated veneer lumber, moulded products including containers, horticultural products, food packaging, food containers for fruits, vegetables, fish and meat to mention a few examples.

While the Applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

Except to the extent necessary or inherent in the processes themselves, no particular order to steps or stages of methods or processes described in this disclosure is intended or implied. In many cases the order of process steps may be varied without changing the purpose, effect, or import of the methods described.

TABLE 1

Solution properties of nano-cellulose-lignin mixtures.

|  | NCF only | NCF only low ph | lignin-NCF99 | lignin-NCF90 (HNCF) | lignin-NCF50 | lignin-NCF10 | lignin-NCF1 | lignin-NCF.5 | lignin-only | lignin-only |
|---|---|---|---|---|---|---|---|---|---|---|
| Solution # | 10 | 9 | 8 | 7 | 6 | 5 | 4 | 3 | 2 | 1 |
| Lignin/NCF weight ratio | 0:100 | 0:100 | 1:99 | 10:90 | 50:50 | 90:10 | 99:1 | 99.5:0.5 | 100:0 | 100:0 |
| Solution pH | 6.4 | 4.0 | 4.2 | 4.2 | 4.2 | 4.0 | 4.2 | 4.1 | 4.1 | 10.2 |
| Density (g/cm$^3$) | 0.97 | 0.97 | 0.97 | 0.99 | 1.00 | 0.98 | 0.97 | 0.96 | 0.91 | 1.03 |
| Viscosity (cp) | 1593 | 1396 | 1311 | 1272 | 2339 | 4343 | 5047 | 5015 | 5635 | 0 |
| Conductivity (μs/cm) | 23 | 174 | 184 | 469 | 2743 | 11550 | 17680 | 18010 | 17463 | 14797 |
| Zeta potential (mV) | −26.9 | −8.8 | −15.7 | −7.2 | −4.8 | −0.5 | −1.7 | −0.5 | −0.5 | −36.9 |

Note:

All viscosity measurements were carried out by using a brookfield viscometer (Model DV-E) with S63 spindle at room temperature. Formulation 1 was out of range for all spindles. Formulation 2-5 were measured with 20 rpm speed and formulation 6-10 were measured with 30 rpm speed

TABLE 2

Colloidal suspension stability test after 5 weeks (solution #'s correspond to those described in Table 1).

|  | NCF Only | NCF only | lignin-NCF99 | lignin-NCF90 (HNCF) | lignin-NCF50 | lignin-NCF10 | lignin-NCF1 | lignin-NCF.5 | lignin-only | lignin-only |
|---|---|---|---|---|---|---|---|---|---|---|
| Solution # | 10 | 9 | 8 | 7 | 6 | 5 | 4 | 3 | 2 | 1 |
| Top Layer w/w (%) | 0.9 | 0.9 | 1.0 | 1.0 | 2.1 | 8.7 | 17.2 | 18.2 | 19.2 | 20.4 |
| Middle Layer w/w (%) | 0.9 | 0.9 | 0.9 | 1.0 | 2.1 | 8.5 | 17.4 | 18.4 | 19.4 | 19.6 |
| Bottom layer w\w (%) | 1.0 | 1.0 | 1.0 | 1.1 | 2.2 | 8.5 | 17.2 | 18.0 | 18.9 | 19.4 |

TABLE 3

Solubility of industrial wheat straw lignin in alkali.

| Mixing Time (min) | Undissolved Lignin (g) | Undissolved Lignin (%) | pH |
|---|---|---|---|
| 1 | 0.175 | 8.75 | 10.53 |
| 10 | — | — | 9.43 |
| 20 | — | — | 9.23 |
| 30 | 0.055 | 2.75 | 9.13 |
| 40 | — | — | 9.03 |
| 50 | — | — | 8.99 |
| 60 | 0.030 | 1.50 | 9.06 |
| 70 | — | — | 9.04 |
| 80 | — | — | 9.02 |
| 90 | 0.006 | 0.30 | 8.98 |

TABLE 4

Handsheet formulations.

| | Pulp slurry only | Pulp slurry + 1% NCF | Pulp slurry + 1% HNCF |
|---|---|---|---|
| Filtrate color | | | none |
| Grams of pulp fiber in handsheet | 16 | 16 | 16 |
| Grams of lignin in handsheet | 0 | 0 | 1.6 |
| Grams of NCF in handsheet | 0 | 1.6 | 0.16 |
| Final pH | 8.9 | 9.2 | 4.8 |

TABLE 5

Handsheet formulations

| | No NCF | 0.1% NCF | 0.25% NCF | 0.5% NCF | 1% NCF |
|---|---|---|---|---|---|
| Grams of pulp fiber in handsheet | 16 | 16 | 16 | 16 | 16 |
| Grams of lignin in handsheet | 1.6 | 1.6 | 1.6 | 1.6 | 1.6 |
| Grams of NCF in handsheet | 0 | 0.016 | 0.04 | 0.08 | 0.16 |
| Final pH | 4.5 | 4.3 | 4.4 | 4.4 | 4.8 |

TABLE 6

Contact angle and work of adhesion of samples.

| Sample | Θ | Cos Θ | $W_A$ |
|---|---|---|---|
| Pulp slurry only | 10 | 0.98 | 142.9 |
| Pulp slurry + 1% NCF | 10 | 0.98 | 142.9 |
| Pulp slurry + 1% HNCF | 100 | −0.17 | 59.5 |

TABLE 7

Sample description and physical characteristics of NCF and HNCF films.

| Sample ID | Percent lignin-to-NCF | End pH | Basis weight (g/m$^2$) | Density (kg/m$^3$) |
|---|---|---|---|---|
| I | 0 | 6.2 | 64.06 | 1391 |
| Ib | 1 | 4.3 | 61.56 | 1288 |
| IIb | 5 | 4.3 | 63.26 | 1251 |
| IIIb | 10 | 4.3 | 58.32 | 1186 |
| VIb | 1 | 4.7 | 58.14 | 1246 |
| Vb | 5 | 4.7 | 63.12 | 1347 |
| VIb | 10 | 4.7 | 59.63 | 1238 |
| VIIb | 1 | 5.5 | 63.52 | 1381 |
| VIIIb | 5 | 5.5 | 62.74 | 1345 |
| IXb | 10 | 5.5 | 62.54 | 1348 |

TABLE 8

Contact angle and work of adhesion of films formulated from NCF and HNCF with pressing step

| Sample | Θ | Cos Θ | $W_A$ |
|---|---|---|---|
| NCF Film | 42.5 | 0.74 | 125.2 |
| HNCF (10% lignin) | 87.5 | 0.04 | 74.9 |

TABLE 9

Water vapour transmission rate of NCF and HNCF films.

| Sample | Grammage gsm | Thickness mm | Flux, g hr$^{-1}$ | WVTR, g m$^{-2}$ hr$^{-1}$ |
|---|---|---|---|---|
| NCF | 57.36 | 0.045 | 0.0780 | 23.49 |
| HNCF (1% low pH) | 56.05 | 0.045 | 0.0710 | 21.38 |
| HNCF (5% low pH) | 59.70 | 0.045 | 0.0616 | 18.55 |
| HNCF (10% low pH) | 58.11 | 0.047 | 0.0594 | 17.89 |
| Copy paper (commercial paper) | 80 | 0.101 | 0.1025 | 30.87 |

TABLE 10

Water and oil resistance of HNCF coating as evaluated by Cobb test and oil penetration

| | Spray Coating | Roll Coating |
|---|---|---|
| Coat weight (g/m$^2$) | 8.19 | 12.1 |
| Cobb120 (g/m$^2$) | 40.6 | 69 |
| Oil penetration (min) | 30 | 30 |

TABLE 11

Leak test for coffee cup lid coated with HNCF

| Sample | HNCF coating | Oven-dry coating weight (g) | Percent coating weight | Leak test (mL) |
|---|---|---|---|---|
| 1 | Inside only | 0.06 | 0.7 | Fail |
| 2 | Inside only | 0.08 | 1.0 | 0.5 |
| 3 | Inside and outside of lid | 0.15 | 1.9 | 0.0 |

TABLE 12

A table comparing the properties of solutions made with nanocellulose versus kraft fiber.

|  | NCF only | Kraft fiber only | lignin-NCF90 (HNCF) | lignin-kraft fiber90 |
|---|---|---|---|---|
| Solution # | 10 | 12 | 7 | 11 |
| Lignin/MCF weight ratio | 0:100 | 0:100 | 10:90 | 10:90 |
| Solution pH | 6.4 | 7.4 | 4.2 | 4.0 |
| Density (g/cm$^3$) | 0.97 | 1.0 | 0.99 | 1.0 |
| Viscosity (cp) | 1593 | 335 | 1272 | 390 |
| Conductivity (μs/cm) | 23 | 16 | 469 | 564 |
| Zeta potential (mV) | −26.9 | −30 | −7.2 | −3.1 |

Note:
Viscosity test for kraft fiber solutions were carried out with spindle S63 at 20 rpm.

WORKS CITED

Arnson, T. (1980). The adsorption of complex aluminum species by cellulosic fibers from dilute solutions of aluminum chloride and aluminum sulphate. *Ph.D. Dissertation.*

Bordeanu, N., Eyholzer, C., and T. Zimmermann. Jun. 17, 2010. Surface modified cellulose nanofibers. Patent WO2010066905 A1.

Cavaille, J-Y., Chanzy, H., Fleury, E., and J-F Sassi. Sep. 12, 2000. Surface-modified cellulose microfibrils, method for making the same and use thereof" as a filler in composite materials. U.S. Pat. No. 6,117,545 A.

Charreau, H., Foresti, M. L., and A. Vazquez. 2013. Nanocellulse Patent Trends: A Comprehensive Review on Patents on Cellulose Nanocrystals, Microfibrillated and Bacterial Cellulose. Recent Patents on Nanotechnology, 2013, 7, 56-80.

Hamad, W. Y. and S. Su. Aug. 18, 2011. Thermoplastic nanocomposite material based on nanocrystalline cellulose (ncc). Patent US20110201755 A1.

Hayden, P. L. and A. J. Rubin. 1974. Systematic Investigation of the Hydrolysis and Precipitation of Aluminum (III). Aqueous Environmental Chemistry of Metal. A. J. Rubin. Ann Arbor: 318-379.

Holbek, K. Dec. 6, 1984. A method for preparing impregnated cellulose fibers having a low water retention and products hereby obtained. Patent WO1984004765 A1.

Hult, E.-L. I. (2010). Efficient approach to high barrier packaging using microfibrillar cellulose and shellac. *Cellulose,* 17 (3), 575-586.

Iguchi M., Yamanaka S., and A. Budhiono. 2000. Review bacterial cellulose—a masterpiece of nature's arts. J Mater Sci 2000; 35: 261-70.

Lavoine, N. D. (2012). Microfibrillated cellulose-Its barrier properties and applications in cellulosic materials: A review. *carbohydrate Polymers,* 90, 735-764.

Rodionova, G., Lenes, M., Eriksen, O. and O. Gregersen. 2010. Surface chemical modification of microfibrillated cellulose: improvement of barrier properties for packaging applications. Cellulose 01/2010; 18(1):127-134.

Spence, K. V. (2010). The effect of chemical composition on microfibrillar cellulose films from wood pulps: water interactions and physical properties for packaging applications. *Cellulose,* 17, 835-848.

Syverud, K. A. (2009). Strength and barrier properties of MFC films. *Cellulose,* 16, 75-85.

Therefore what is claimed is:

1. A composition, comprising;
an aqueous component and a hydrophobic complex comprised of a multivalent metal salt complexed with nanocellulose fibers and lignin, the composition exhibiting a viscosity sufficient to prevent coalescing and settling of the hydrophobic complex in the aqueous component.

2. The composition according to claim 1, wherein the multivalent metal salt is alum.

3. The composition according to claim 1, wherein the multivalent metal salt is a salt of a multivalent metal and a monoatomic or polyatomic ion, the multivalent metal being selected from the group consisting of aluminum, calcium, cobalt, iron, manganese, zinc, chromium, copper, tin, cadmium and nickel, and the monoatomic or polyatomic ion being any one of sulphate, phosphate, nitrate, chlorate, and chloride.

4. The composition according to claim 1, wherein the nanocellulose fibers are nanocellulose fibers in a form of a slurry.

5. The composition according to claim 4, wherein the concentration of the nanocellulose fiber slurry is between 0.001 to 5 w/w %.

6. The composition according to claim 5, wherein a concentration of the nanocellulose fiber slurry is in a range from about 0.1 to about 2 w/w %.

7. The composition according to claim 1, wherein the lignin is an aqueous mixture of lignin and lignin derivatives.

8. The composition according to claim 7, wherein a pH of the aqueous mixture of lignin and lignin derivatives is in a range from about 7 to about 14.

9. The composition according to claim 8, wherein the pH range of the aqueous mixture of lignin and lignin derivatives is between about 8 to about 12.

10. The composition according to claim 1, wherein the aqueous component is selected from the group consisting of water, acetone in water, and alcohol in water.

11. The composition according to claim 1, wherein the hydrophobic complex is present in the aqueous component in a range between about 0.01 w/w % to about 50 w/w %.

12. The composition according to claim 11, wherein the hydrophobic complex is present in the aqueous component in an amount between about 0.1 w/w % to about 10 w/w %.

13. The composition according to claim 1, wherein the hydrophobic complex present in an aqueous component has a pH in a range from about 2 to about 10.

14. The composition according to claim 13, wherein the pH range is in a range from about 3.0 to about 6.0.

15. A method of producing a stable suspension, comprising:
mixing nanocellulose fibers in an aqueous solution along with solubilized lignin with a multivalent metal salt under conditions suitable for the nanocellulose fibers, the multivalent metal salt and the solubilized lignin to form a hydrophobic nanocellulose fiber complex to give a suspension of the hydrophobic nanocellulose fiber complex in an aqueous component exhibiting a viscosity sufficient to prevent coalescing and settling of the hydrophobic complex in the aqueous component such that the hydrophobic nanocellulose fiber complex exhibits stability in the aqueous solution.

16. The method according to claim 15, wherein the nanocellulose fiber slurry is present in the aqueous solution in the range between about 0.001 to about 5 w/w %.

17. The method according to claim 16, wherein the nanocellulose fiber slurry is diluted in aqueous solution preferably between from about 0.1 to about 2 w/w %.

18. The method according to claim 15, wherein the lignin is solubilized in an alkaline medium at a pH in a range from about 7 to about 14.

19. The method according to claim 18, wherein the lignin is solubilized in an alkaline medium with a pH in a range from about 8 to about 12.

20. The method according to claim 15, wherein the multivalent metal salt is added in an amount sufficient to obtain a final pH of the suspension in a range from about 2 to about 10.

21. The method according to claim 20, wherein the multivalent metal salt is added in an amount sufficient to obtain a final pH of the suspension in a range from about 3 to 6.

22. The method according to claim 15 wherein the stable suspension is produced at ambient temperature.

23. The method according to claim 15, wherein the multivalent metal salt is alum.

24. The method according to claim 15, wherein the multivalent metal salt is a salt of a multivalent metal and a monoatomic or polyatomic ion, the multivalent metal being selected from the group consisting of aluminum, calcium, cobalt, iron, manganese, zinc, chromium, copper, tin, cadmium and nickel, and the monoatomic or polyatomic ion being any one of sulphate, phosphate, nitrate, chlorate, and chloride.

25. The method according to claim 15, wherein the lignin is an aqueous mixture of lignin and lignin derivatives.

26. The method according to claim 25, wherein a pH range of the aqueous mixture of lignin and lignin derivatives is between about 8 to about 12.

27. The method according to claim 15, wherein the aqueous component is selected from the group consisting of water, acetone in water, and alcohol in water.

28. The method according to claim 15, wherein the hydrophobic complex is present in the aqueous component in an amount between about 0.1 w/w % to about 10 w/w %.

29. The method according to claim 15, wherein the hydrophobic complex present in an aqueous component has a pH in a range from about 3.0 to about 6.0.

30. A method of producing a hydrophobic surface, comprising;
    applying a composition to a surface of an article, the composition comprising
        an aqueous component and a hydrophobic complex formed by a multivalent metal salt complexed with nanocellulose fibers and
    solubilized lignin, the composition exhibiting a viscosity sufficient to prevent coalescing and settling of the hydrophobic complex in the aqueous component; and
    spreading the composition to form a wet film covering the surface and dewatering the wet film to produce a dried coating.

31. The method according to claim 30, wherein the article includes glass, cotton, wood, plastic, paper or paper products.

32. The method according to claim 30, wherein the article includes paper, paperboard, medium density fiberboard, hardboard, particleboard, lumber, laminated veneer lumber, moulded products, horticultural products, food packaging, food containers for fruits, vegetables, fish or meat.

33. The method according to claim 30, wherein the temperature for dewatering is in a range from about 25° C. to about 500° C.

34. The method according to claim 33, wherein the temperature for dewatering is in a range from about 100° C. to about 250° C.

35. The method according to claim 30, wherein the multivalent metal salt is alum.

36. The method according to claim 30, wherein the nanocellulose fibers are nanocellulose fibers in a form of a slurry.

37. The method according to claim 36, wherein the concentration of the nanocellulose fiber slurry is between 0.001 to 5 w/w %.

38. The method according to claim 37, wherein a concentration of the nanocellulose fiber slurry is in a range from about 0.1 to about 2 w/w %.

39. The method according to claim 30, wherein the lignin is an aqueous mixture of lignin and lignin derivatives.

40. The method according to claim 39, wherein a pH of the aqueous mixture of lignin and lignin derivatives is in a range from about 8 to about 12.

* * * * *